(12) United States Patent
Saito et al.

(10) Patent No.: US 7,054,959 B2
(45) Date of Patent: May 30, 2006

(54) ISOCHRONOUS DATA TRANSFER CONTROL METHOD INCLUDING PACKET CONFIGURATION OF THUS-READ ISOCHRONOUS HEADER AND DATA

(75) Inventors: Nobuyuki Saito, Sapporo (JP); Daisuke Sato, Chino (JP); Yoshimi Oka, Kitahiroshima (JP)

(73) Assignee: Seiko Epson Corporation, Tokyo (JP)

( * ) Notice: Subject to any disclaimer, the term of this patent is extended or adjusted under 35 U.S.C. 154(b) by 306 days.

(21) Appl. No.: 10/390,862

(22) Filed: Mar. 19, 2003

(65) Prior Publication Data

US 2003/0204660 A1 Oct. 30, 2003

(30) Foreign Application Priority Data

Mar. 20, 2002 (JP) ............................. 2002-077976

(51) Int. Cl.
*G11B 5/76* (2006.01)
*G06F 13/00* (2006.01)

(52) U.S. Cl. ..................... 710/33; 710/22; 710/24; 710/30; 369/60

(58) Field of Classification Search ............... 710/22, 710/24, 33; 369/60
See application file for complete search history.

(56) References Cited

U.S. PATENT DOCUMENTS

| 5,974,015 | A  | * | 10/1999 | Iizuka et al. ............. 386/96 |
| 6,081,852 | A  | * | 6/2000  | Baker ....................... 710/24 |
| 6,199,132 | B1 | * | 3/2001  | Hewitt et al. .............. 710/107 |
| 6,336,179 | B1 | * | 1/2002  | Gulick ...................... 712/32 |
| 6,418,150 | B1 | * | 7/2002  | Staats ...................... 370/503 |
| 2001/0024472 | A1 | * | 9/2001  | Sporer et al. ........... 375/240.16 |
| 2002/0026543 | A1 | * | 2/2002  | Tojima et al. ............. 710/22 |

FOREIGN PATENT DOCUMENTS

| JP | A 2000-134230 | 5/2000 |
| JP | A 2001-186146 | 7/2001 |
| JP | A 2002-077827 | 3/2002 |

OTHER PUBLICATIONS

U.S. Appl. No. 10/379,709, filed Mar. 6, 2003, Saito et al.
U.S. Appl. No. 10/379,910, filed Mar. 6, 2003, Saito et al.
U.S. Appl. No. 10/390,702, filed Mar. 19, 2003, Saito et al.

* cited by examiner

*Primary Examiner*—Tammara Peyton
(74) *Attorney, Agent, or Firm*—Oliff & Berridge, PLC

(57) ABSTRACT

A processing section reserves a number of transfers for an isochronous packet which includes isochronous data in an transfer number reservation register TNREG. A DMAC1 reads that isochronous packet from SRAM, and the thus-read isochronous packet is transferred automatically to a BUS1 (IEEE 1394 or USB) side at each isochronous transfer cycle until the number of transfers reserved in TNREG reaches zero. An SRAM header area is divided into page K and page L areas, and registers TNREGK and TNREGL are provided for reserving a number of transfers for each of the page K and L areas. During a special reproduction, a data pointer is used to select a TS packet which includes an I picture, for automatic transfer to the BUS1 side.

17 Claims, 30 Drawing Sheets

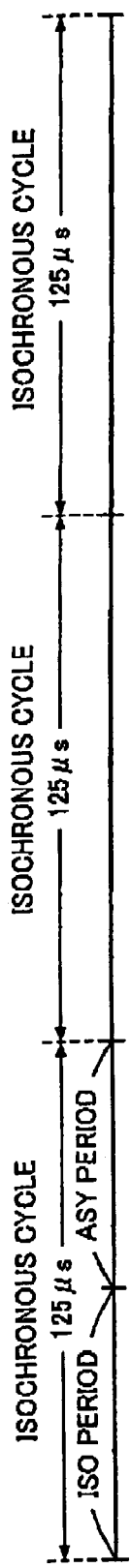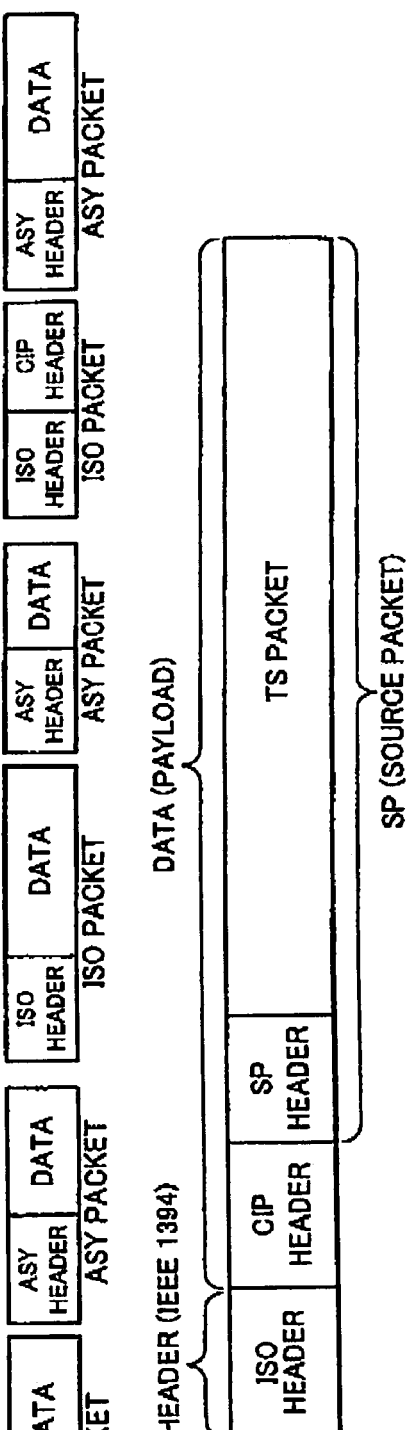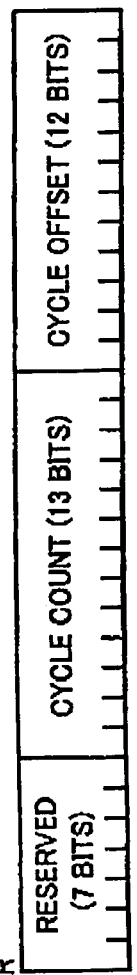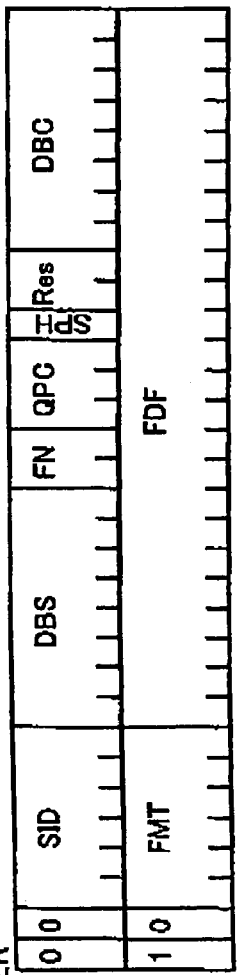
FIG. 2A
FIG. 2B HEADER (IEEE 1394)
FIG. 2C SP HEADER
FIG. 2D CIP HEADER FIG. 5A RECEPTION
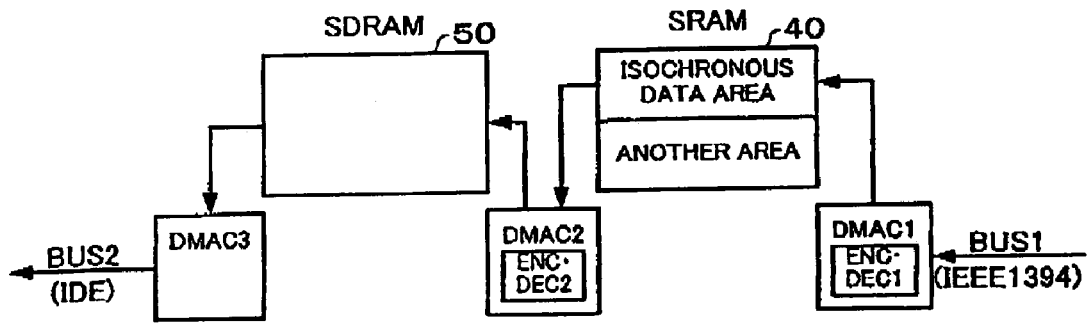
FIG. 5B RECEPTION
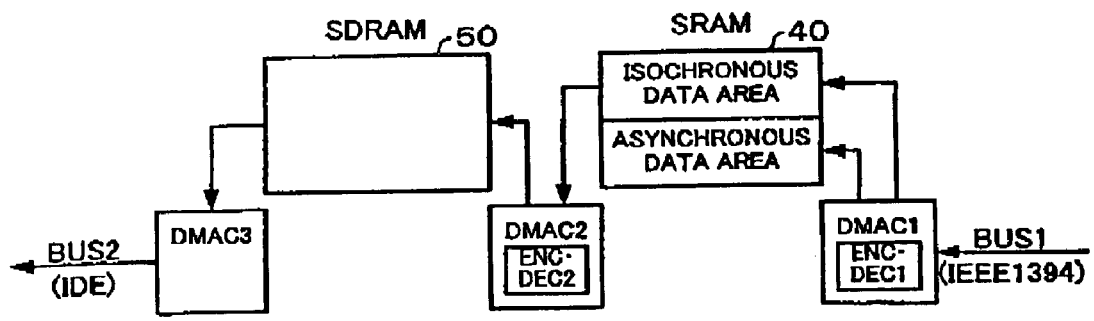
FIG. 5C RECEPTION
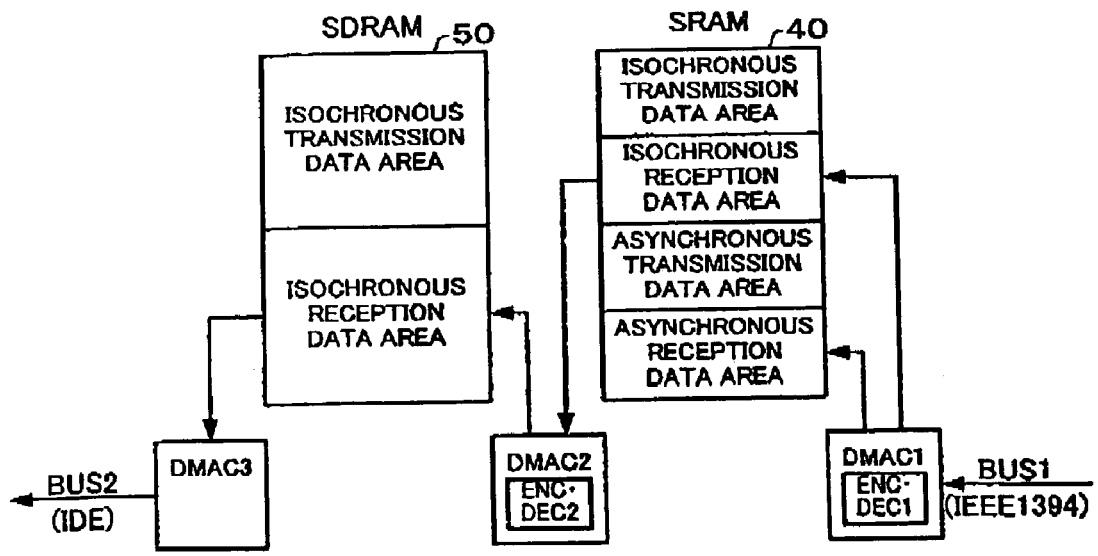

FIG. 6A    TRANSMISSION
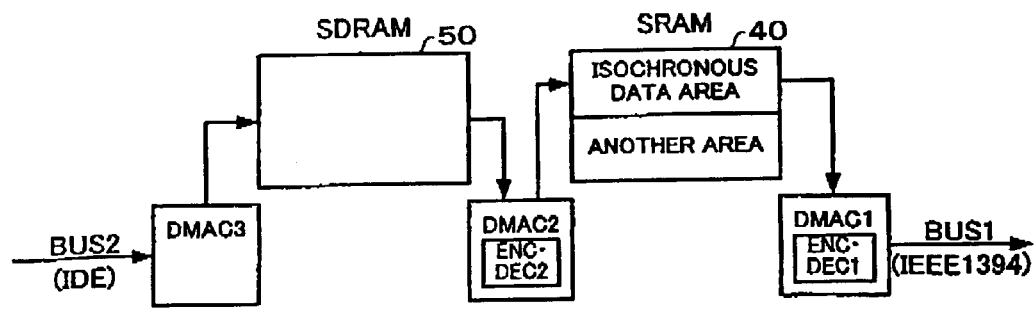
FIG. 6B    TRANSMISSION
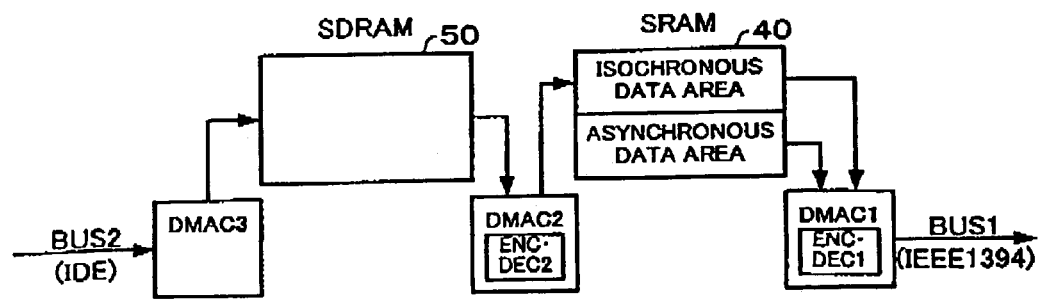
FIG. 6C    TRANSMISSION
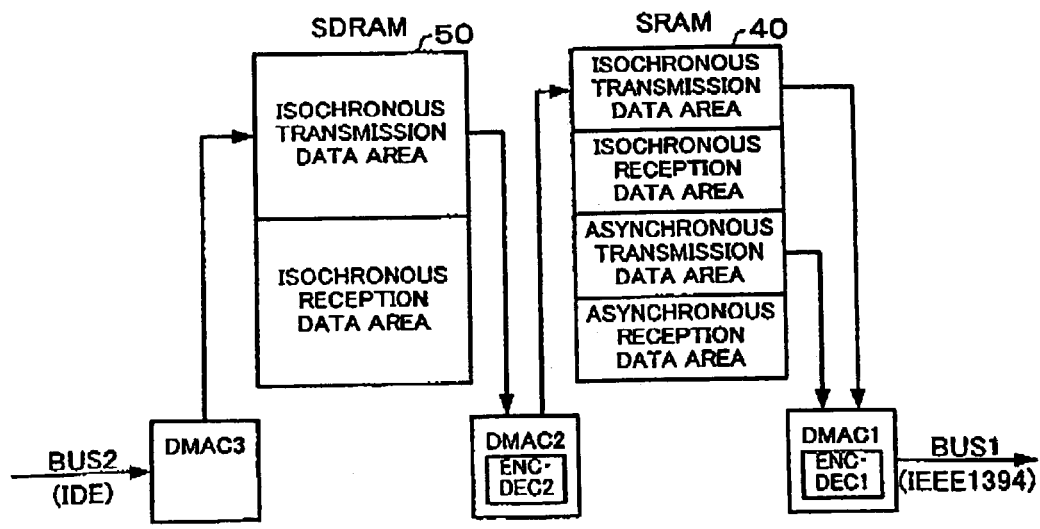

FIG. 9A  RECEPTION
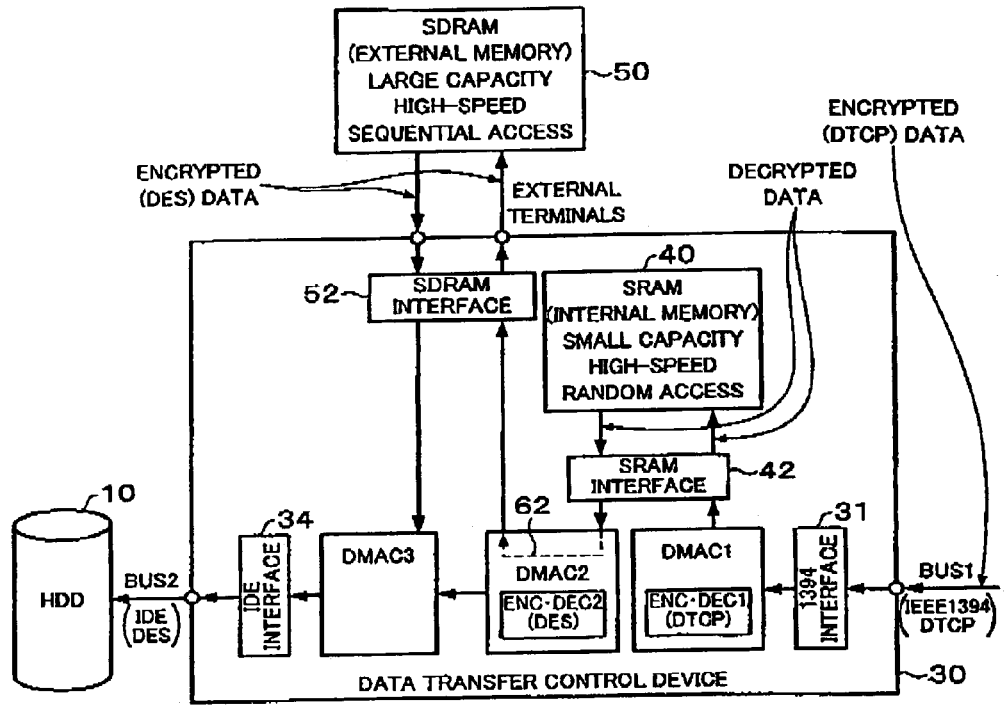
FIG. 9B  TRANSMISSION
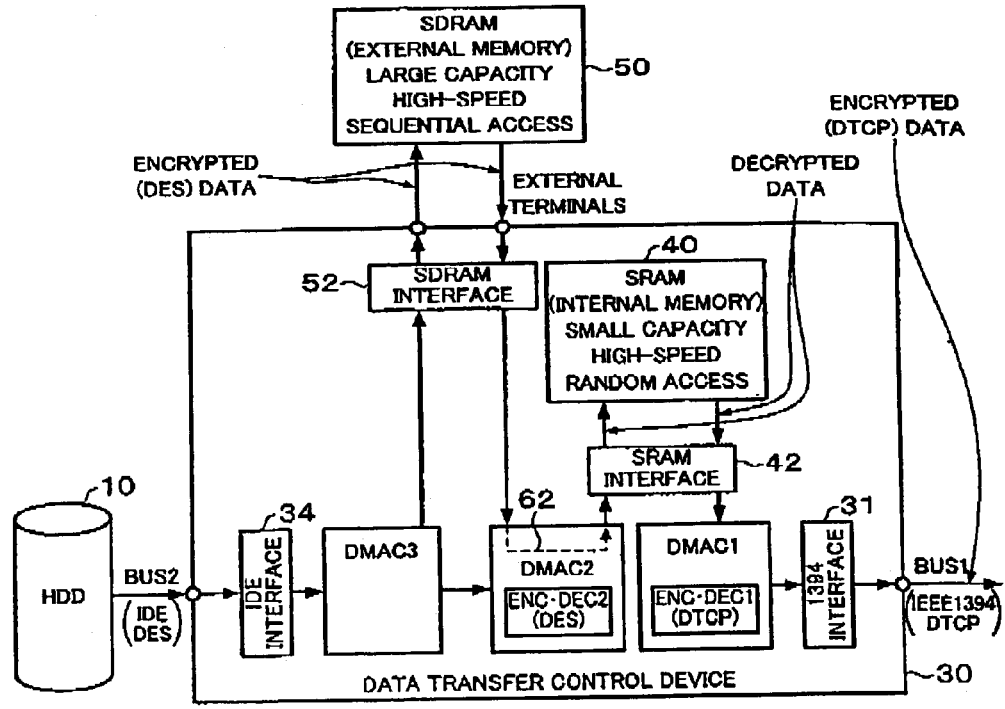

FIG. 10A  RECEPTION
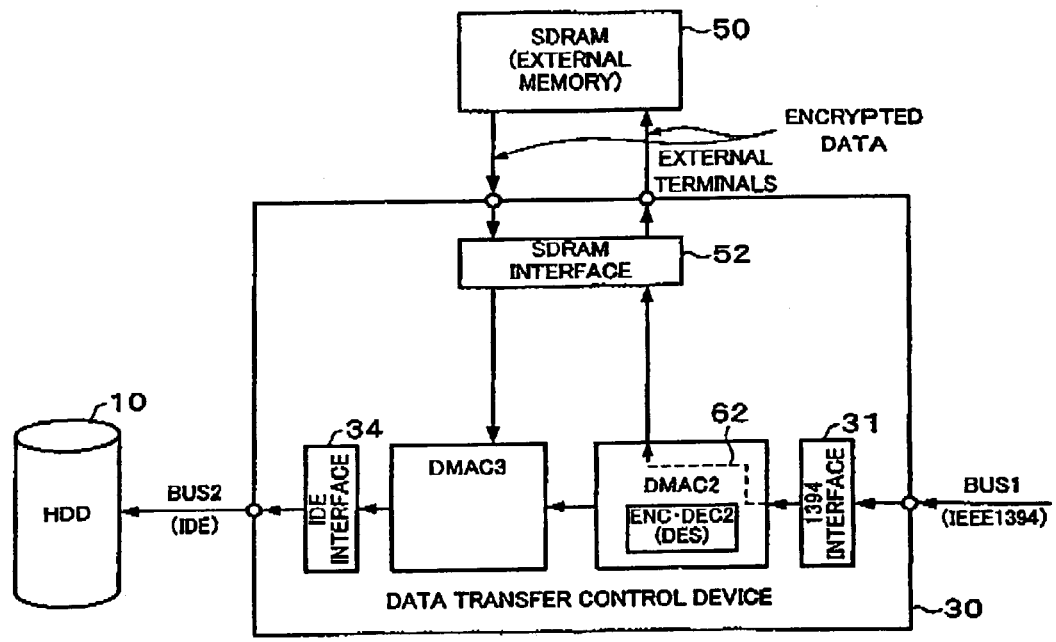
FIG. 10B  TRANSMISSION
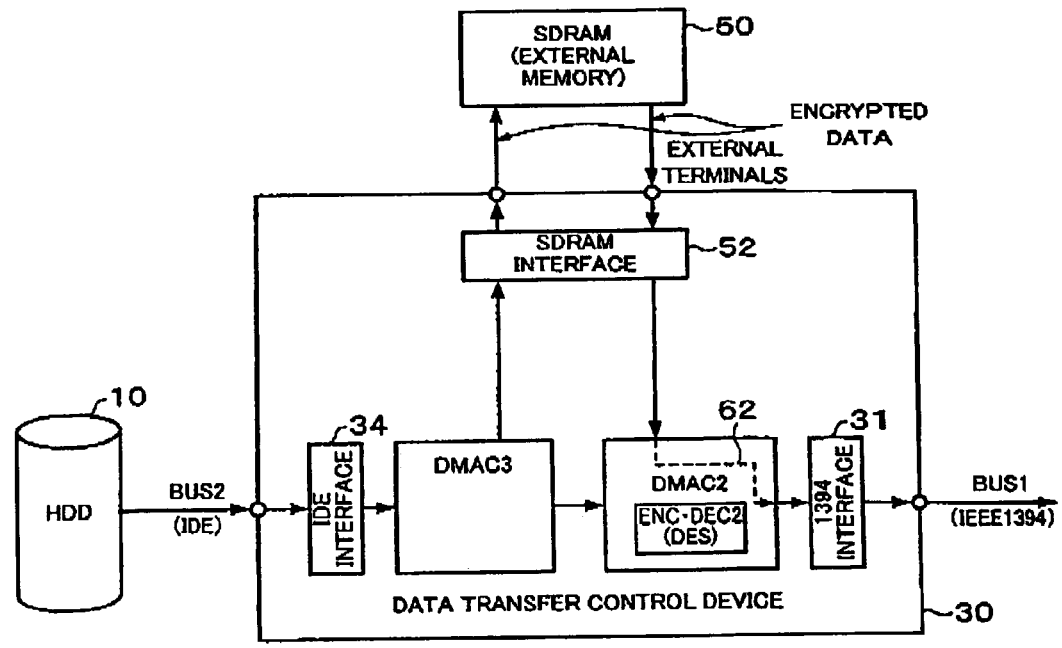

FIG. 13A  BETWEEN SDRAM AND SDRAM INTERFACE

| | | |
|---|---|---|
| | RAMCLK | SYNCHRONIZATION CLOCK FOR SDRAM |
| CONTROL SIGNALS | CKE | SIGNAL INDICATING WHETHER OR NOT CLOCK IS VALID |
| | XRAS | ROW ADDRESS STROBE |
| | XCAS | COLUMN ADDRESS STROBE |
| | XWE | WRITE ENABLE |
| | UDQM | HIGH-ORDER BYTE OUTPUT ENABLE |
| | LDQM | LOW-ORDER BYTE OUTPUT ENABLE |
| | Address[13:0] | ADDRESS (14 BITS) |
| | Data[15:0] | DATA (16 BITS) |

FIG. 13B  BETWEEN DMAC2 AND SDRAM INTERFACE

| | |
|---|---|
| Host2Addr[23:0] | READ/WRITE ADDRESS FROM DMAC2 TO SDRAM |
| HostWrData2[15:0] | WRITE DATA FROM DMAC2 TO SDRAM |
| HostRdData2[15:0] | READ DATA FROM SDRAM TO DMAC2 |
| HostRdReq2 | READ REQUEST FROM DMAC2 TO SDRAM |
| HostRdAck2 | READ ACKNOWLEDGEMENT FROM SDRAM TO DMAC2 |
| HostWrReq2 | WRITE REQUEST FROM DMAC2 TO SDRAM |
| HostWrAck2 | WRITE ACKNOWLEDGEMENT FROM SDRAM TO DMAC2 |

FIG. 13C  BETWEEN DMAC3 AND SDRAM INTERFACE

| | |
|---|---|
| Ide3Addr[23:0] | READ/WRITE ADDRESS FROM DMAC3 TO SDRAM |
| IdeWrData3[15:0] | WRITE DATA FROM DMAC3 TO SDRAM |
| IdeRdData3[15:0] | READ DATA FROM SDRAM TO DMAC3 |
| IdeRdReq3 | READ REQUEST FROM DMAC3 TO SDRAM |
| IdeRdAck3 | READ ACKNOWLEDGEMENT FROM SDRAM TO DMAC3 |
| IdeWrReq3 | WRITE REQUEST FROM DMAC3 TO SDRAM |
| IdeWrAck3 | WRITE ACKNOWLEDGEMENT FROM SDRAM TO DMAC3 |

FIG. 23

TNREG

| F | E | D | C | B | A | 9 | 8 | 7 | 6 | 5 | 4 | 3 | 2 | 1 | 0 |
|---|---|---|---|---|---|---|---|---|---|---|---|---|---|---|---|
|   |   |   |   | PAGE L COUNT |   |   |   |   |   |   |   | PAGE K COUNT |   |   |   |

SPECIAL REPRODUCTION (TRICK PLAY)

ISOCHRONOUS DATA TRANSFER CONTROL METHOD INCLUDING PACKET CONFIGURATION OF THUS-READ ISOCHRONOUS HEADER AND DATA

Japanese Patent Application No. 2002-77976, filed on Mar. 20, 2002, is hereby incorporated by reference in its entirety.

BACKGROUND OP THE INVENTION

The present invention relates to a data transfer control device, an electronic instrument, and a data transfer control method.

It has recently become popular to distribute digital audiovisual (AV) data by digital broadcasting or over the Internet. Together with the spread of this digital distribution of AV data, there have been increasing demands for digital recording/reproduction devices (electronic instruments) that are capable of recording the thus-distributed data efficiently.

A high-speed serial bus such as one in accordance with IEEE 1394 or the universal serial bus (USB) 2.0 is used for the transfer of AV data, to ensure real-time capabilities. A digital recording/reproduction device (electronic instrument) that records AV data is preferably provided with a storage medium such as a hard disk drive (HDD) that is capable of storing large volumes of data at high speed.

For that reason, the demand is increasing for a data transfer control device that can transfer data rapidly between a high-speed bus in accordance with IEEE 1394 or USB 2.0 and a storage medium such as an HDD.

BRIEF SUMMARY OF THE INVENTION

According to an aspect of the present invention, there is provided a data transfer control device for data transfer through a bus, comprising: a transfer number reservation register which is used by a processing section to reserve a number of transfers for an isochronous packet which includes isochronous data; and a first memory access control circuit which reads an isochronous packet from a first memory and automatically transfers the thus-read isochronous packet to a first bus side in each isochronous transfer cycle, until a number of transfers which is reserved in the transfer number reservation register reaches zero.

BRIEF DESCRIPTION OF THE SEVERAL VIEWS OF THE DRAWING

FIGS. 2A, 2B, 2C, and 2D are illustrative of isochronous transfer and asynchronous transfer;

FIGS. 5A, 5B, and 5C are illustrative of the data transfer control method according to one embodiment of the present invention;

FIGS. 6A, 6B, and 6C are further illustrative of the data transfer control method according to one embodiment of the present invention;

FIGS. 9A and 9B are illustrative of a method that provides SDRAM outside of the data transfer control device;

FIGS. 10A and 10B are also illustrative of a method that provides SDRAM outside of the data transfer control device;

FIGS. 13A, 13B, and 13C show the meanings of the signals used by the data transfer control device;

FIG. 23 shows an example of the register map of the transfer number reservation register;

DETAILED DESCRIPTION OF THE EMBODIMENTS

Figure 1A:
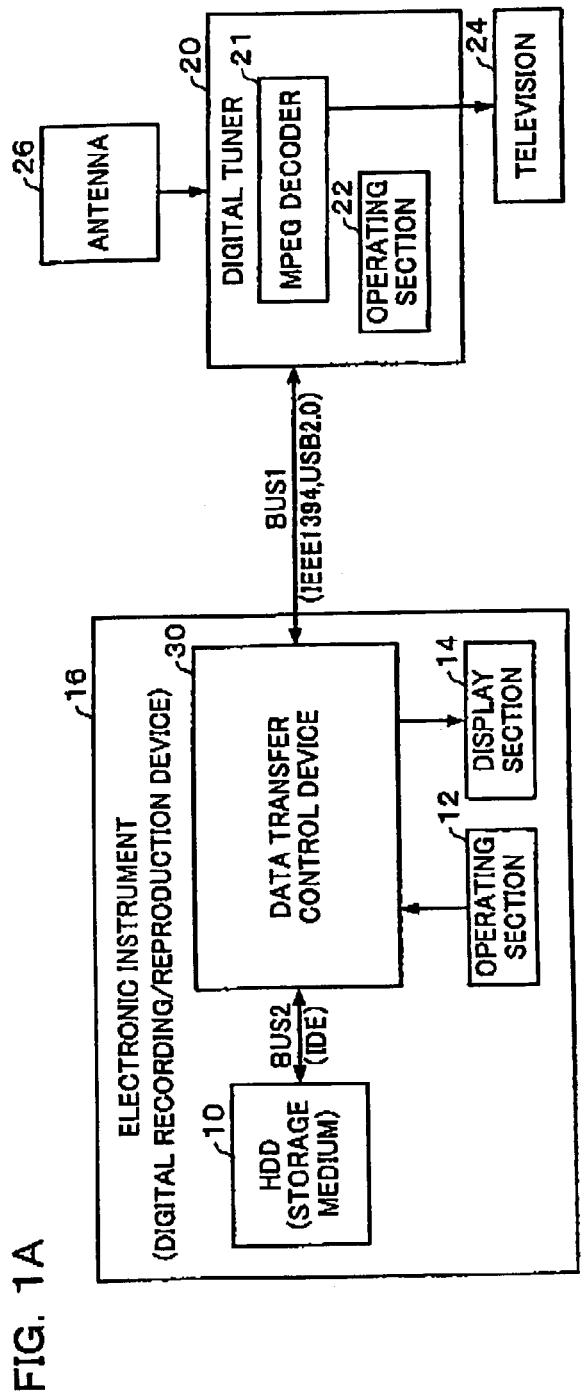
FIGS. 1A and 1B show examples of the configuration of an electronic instrument in accordance with one embodiment of the present invention.

Embodiments of the present invention will be described below.

Note that the embodiments described below do not in any way limit the scope of the invention laid out in the claims herein. In addition, all the elements of the embodiments described below should not be taken as essential requirements of the present invention.

According to one embodiment of the present invention, there is provided a data transfer control device for data transfer through a bus, comprising: a transfer number reservation register which is used by a processing section to reserve a number of transfers for an isochronous packet which includes isochronous data; and a first memory access control circuit which reads an isochronous packet from a first memory and automatically transfers the thus-read isochronous packet to a first bus side in each isochronous transfer cycle, until a number of transfers which is reserved in the transfer number reservation register reaches zero.

In this embodiment, the processing section reserves a number of transfers for isochronous packets in the transfer number reservation register. When that happens, isochronous packets (isochronous headers and isochronous data) are read from the first memory, and the thus-read isochronous packets are automatically transferred to the first bus side in each isochronous transfer cycle, until the reserved number of transfers in the transfer number reservation register reaches zero (including a case that is substantially the same as zero).

This configuration makes it possible for the processing section to avoid participating in the data transfer, after reserving the number of transfers. It is therefore possible to use spare time for other processes, enabling more efficient processing.

This embodiment also makes it possible to reserve a desired number of transfers in accordance with circumstances such as size of the isochronous data, the classification of isochronous data being transferred, or time stamp information.

In this embodiment, when a number of transfers reserved in the transfer number reservation register has reached zero, the first memory access control circuit may halt the automatic transfer at the next isochronous transfer cycle and output an interrupt to the processing section.

This makes it possible for the processing section to use the time after the reservation of a number of transfers up until an interrupt comes into, for other processes, thus making the processing more efficient.

In this embodiment, a storage area of the first memory may include a header area and a data area; the header area may include Kth and Lth page areas; the transfer number reservation register may include transfer number reservation registers for the Kth and Lth pages, for reserving a number of transfers for the Kth and Lth page areas; and while the processing section is preparing an isochronous header to be written to the Kth page area, the first memory access control circuit may read an isochronous header written to the Lth page area and isochronous data written to the data area, and automatically transfer an isochronous packet configured of the thus-read isochronous header and isochronous data, to the first bus side in each isochronous transfer cycle, until a number of transfers which is reserved in the transfer number reservation register for the Lth page reaches zero.

This configuration ensures that the processing section need not be aware of how far the transfer of isochronous packets has progressed while performing the task of writing isochronous headers to the header area. This makes it possible to simplify the processing of the processing section.

Note that the number of pages of the header area and the transfer number reservation register could be three or more.

In this embodiment, a storage area of the first memory may include a header area and a data area; a data pointer which indicates an address in the data area for isochronous data to be combined with an isochronous header may be written to the header area; and the first memory access control circuit nay assemble an isochronous packet configured of the isochronous header and isochronous data by using the data pointer, for automatic transfer to the first bus side.

This makes it possible for even the assembly of isochronous packets to be done automatically, without the participation of the processing section, enabling a further reduction in the processing load of the processing section.

In this embodiment, when isochronous data which is written to the data area includes a plurality of second-layer packets located lower than isochronous packets, the first memory access control circuit may use the data pointer to sort a second-layer packet which is to be transferred to the first bus side from a second-layer packet which is not to be transferred to the first bus side.

This makes it possible to implement sorting of second-layer packets (such as ITS packets) by processing with reduced load.

During special reproduction of a storage medium in this embodiment, the first memory access control circuit may use the data pointer to select a second-layer packet including an I picture and automatically transfer the thus-selected second-layer packet to the first bus side.

This makes it possible to transfer second-layer packets having I pictures, which are necessary for special reproduction, to the first bus side with simple processing, enabling the implementation of high-quality special reproduction.

This data transfer control device may further comprise: a third memory access control circuit which writes isochronous data transferred from a second bus side connected to a storage medium, into a second memory having a larger capacity than the first memory; and a second memory access control circuit which reads isochronous data written to the second memory and writes the thus-read isochronous data into the first memory, wherein the first memory access control circuit reads from the first memory an isochronous packet having isochronous data written to the first memory, and automatically transfers the thus-read isochronous packet to the first bus side in each isochronous transfer cycle, until a number of transfers reserved in the transfer number reservation register reaches zero.

This makes it possible to write the isochronous data transferred from the second bus side into a large capacity second memory. The isochronous data is then read from the second memory and written to the small-capacity first memory. An isochronous packet including the thus-written isochronous data is then transferred to the first bus side.

According to this embodiment, the isochronous data transferred from the second bus side is buffered by the second memory that functions as cache memory, for transfer to the first bus side. This makes it possible to transfer isochronous data, which has to be transferred without break at a fixed transfer rate, efficiently from the second bus side to the first bus side.

In this embodiment, the second memory may be a synchronized type of memory which is capable of inputting and outputting data having sequential addresses in synchronization with a clock.

If a synchronized type of memory is used for the second memory, it is possible to efficiently transfer isochronous data that is to be transferred as burst data.

In this embodiment, the first memory may be internal memory provided within the data transfer control device, and the second memory maybe external memory provided outside the data transfer control device.

This configuration makes it possible to design a more compact, less expensive data transfer control device.

According to another embodiment of the present invention, there is provided an electronic instrument that comprises the above described data transfer control device; and a storage medium connected to the second bus of the data transfer control device, for storing data transferred through the second bus.

According to further embodiment of the present invention, there is provided a data transfer control method for data transfer through a bus, the method comprising; reserving a number of transfers for an isochronous packet which includes isochronous data, in a transfer number reservation register; and reading an isochronous packet from a first memory, and automatically transferring the thus-read isochronous packet to a first bus side in each isochronous transfer cycle, until a number of transfers reserved in the transfer number reservation register reaches zero.

These embodiments will be described in detail below, with reference to the accompanying figures.

1. Electronic Instrument

Figure 1B:
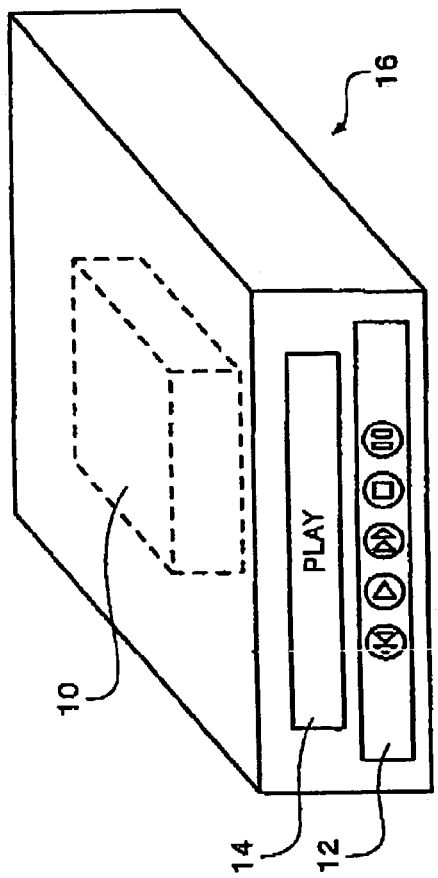

A typical block diagram of an electronic instrument (digital recording/reproduction device) that comprises a data transfer control device 30 according to one embodiment of the present invention is shown in FIG. 1A, and a typical external view thereof is shown in FIG. 1B.

This electronic instrument 16 comprises a hard disk drive (HDD) 10 and the data transfer control device 30. It also comprises an operating section 12 that enables the user to operate the electronic instrument. It further comprises a display section 14 (LCD) that displays various items of information to the user.

The user can specify details such as the reproduction mode (normal reproduction or special reproduction), by operating the operating section 12. Details such as the current reproduction mode can be confirmed by viewing information that is displayed on the display section 14.

This electronic instrument 16 is connected to a digital tuner 20 (or digital video camera) by a first bus BUS1 such as an IEEE 1394 bus or a USB 2.0 bus. The digital tuner 20 also comprises a moving picture experts group (MPEG) decoder 21 (generally speaking: a decoder), where this MPEG decoder 21 decodes an SPEG stream that has been received by components such as an antenna 26. A television 24 (display section) displays images and outputs sounds, based on the decoded data. The user uses an operating section 22 (such as a remote control) to perform operations such as select a channel (broadcast station) or specify a reproduction mode (normal reproduction or special reproduction).

During the recording of an MPEG stream to the HDD 10 (generally speaking: a storage medium) for audio-visual (AV) use, the MPEG stream (TS packets) that has been received by the antenna 26 is written to the HDD 10 via the BUS1 (IEEE 1394 or USB 2.0) and the data transfer control device 30.

During the reproduction of an MPEG stream from the HDD 10, on the other hand, the MPEG stream (TS packets or isochronous data) is read from the HDD 10 through a second bus BUS2 such as an integrated device electronics (IDE) bus. The thus-read MPEG stream is transferred to the digital tuner 20 through the BUS1 and is decoded by the MPEG decoder 21 of the digital tuner 20. This causes the display of images on the television 24.

Note that the electronic instrument to which the present invention is applied is not limited to the electronic instrument shown in FIGS. 1A and 1B. The present invention could also be applied to various other electronic instruments such as a video tape recorder (with internal HDD), an optical disk (DVD) recorder, a digital video camera, a personal computer, or a portable type of information terminal.

2. Isochronous Transfer

The packet transfer methods provided by IEEE 1394 are asynchronous transfer (ideal for data transfer where reliability is required) and isochronous transfer (ideal for the transfer of data such as moving images and sounds, real-time capabilities are required). Asynchronous transfer is a transfer method that does not guarantee the transfer rate of the data but does guarantee the reliability of the data. Isochronous transfer, on the other hand, is a transfer method that does not guarantee the reliability of the data but does guarantee the immediacy of the transfer. This isochronous transfer is supported by the universal serial bus (USB) standard.

The bus states during data transfer under IEEE 1394 are shown schematically in FIG. 2A.

An isochronous transfer starts with the cycle master generating a cycle-start packet every fixed period. This enables the transfer of at least one isochronous (ISO) packet every 125 µs (every isochronous transfer cycle), per channel. As a result, it is possible to transfer requested data such as moving images and sounds, in a real-time manner.

Asynchronous transfer occurs in the intervals between isochronous transfers. In other words, with IEEE 1394, isochronous transfer has a higher priority than asynchronous transfer, and the remaining periods after isochronous transfer has ended are utilized for the transfer of asynchronous (ASY) packets.

An example of the format of an isochronous transfer packet during the transfer of an MPEG stream over an IEEE 1394 bus is shown in FIG. 2B.

In FIG. 2B, the ISO header corresponds to the header of a packet in IEEE 1394 format and the common isochronous packet (CIP) header source packet (SP) header, and transport stream (TS) packet correspond to packet data (payload) in IEEE 1394 format.

Examples of the formats of these SP and CIP headers are shown in FIGS. 2C and 2D. These SP and CIP headers are defined by the IEC 61883 standard that laid down the protocol for the transfer of an MPEG stream over an IEEE 1394 bus. The SP header comprises data such as time stamp information (number of cycles for the isochronous transfer and an offset within the isochronous transfer cycles). The CIP header declares that the data to be transferred is MPEG data, it specifies the division method of the MPEG TS packets, and it also comprises data such as source node ID, data block size, and format ID.

Note that the SP header is not necessary if the electronic instrument connected to the IEEE 1394 bus is a digital video camera or the like, instead of a digital tuner. In such a case, time stamp information is comprised within the CIP header.

3. Configuration of Date Transfer Control Device

Figure 3:
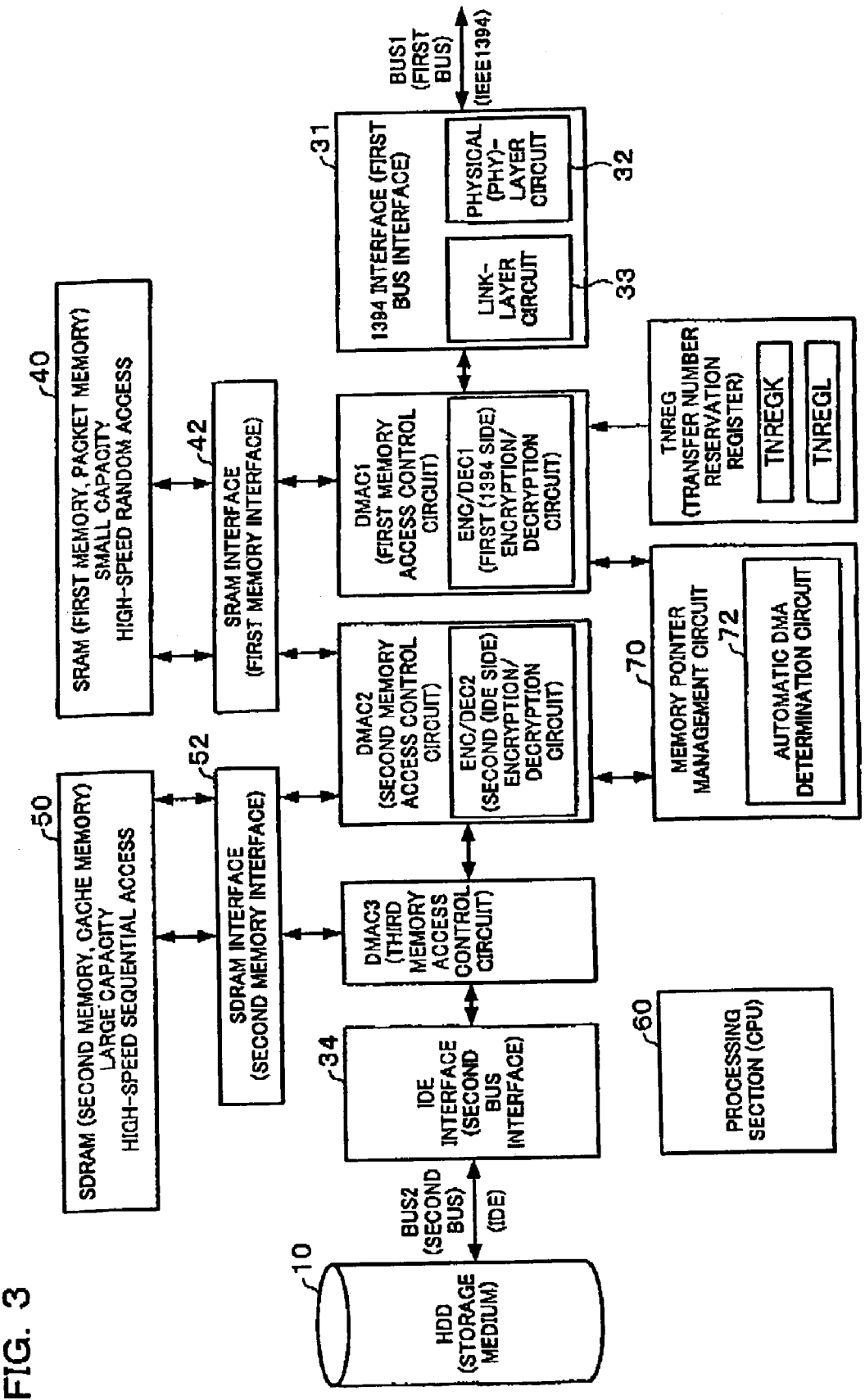
FIG. 3 shows an example of the configuration of the data transfer control device according to one embodiment of the present invention.

An example of the configuration of the data transfer control device of this embodiment (denoted by reference number 30 in FIG. 1) is shown in FIG. 3. Note that the data transfer control device of this embodiment does not necessarily comprise all of the circuits and units (components) shown in FIG. 3; it is also possible to have a configuration in which some of them are omitted.

The data transfer control device of FIG. 3 comprises a 1394 interface 31 (generally speaking: a first bus interface). This 1394 interface 31 implements an interface between the data transfer control device and other electronic instruments (such as a digital tuner) connected to an IEEE 1394 bus (the first bus BUS1). It also comprises physical-layer (PHY)

circuitry 32 and link-layer circuitry 33 that implement a physical layer and a link layer under the IEEE 1394 protocol.

The data transfer control device comprises an IDE interface 34 (generally speaking: a second bus interface or an interface for storage media). The IDE interface 34 is circuitry that implements an interface between the data transfer control device and the hard disk drive HDD 10 (generally speaking: a storage medium).

If the HDD 10 is for AY use, an inexpensive HDD having an IDE (ATA) interface, which is widely used for personal computers, is used therefor. For an electronic instrument such as a digital tuner (BS tuner or CS tuner) on the other hand, IEEE 1394 is widely used as the interface for digital data (digital video data or digital audio data).

If the 1394 interface 31 and the IDE interface 34 are provided, as shown in FIG. 3, a conversion bridge function between IEEE 1394 (generally speaking: a first bus standard) and IDE (generally speaking: a second bus standard) could be implemented in the data transfer control device.

The data transfer control device comprises an SRAM interface 42 that implements an interface with static random access memory (SRAM) 40. It also comprises an SDRAM interface 52 that implements an interface with synchronous dynamic random access memory (SDRAM) 50.

In this case, the SRAM 40 (generally speaking: a first memory, packet memory or packet buffer) is smaller in capacity than the SDRAM 50 (second memory). Random access memory can be operated at high speeds.

This SRAM 40 has the function of temporarily storing packets (ISO packets or TS packets) that have been received through the first bus BUS1 (IEEE 1394 or the like). It also has the function of temporarily storing packets (TS packets) that have been read from the HDD 10 through the second bus BUS2, for transfer over BUS1.

The SRAM 40 is memory that can be accessed at random by components such as a first direct memory access controller (DMAC1), a DMAC2, and a processing section 60 (such as a CPU, MPU, or system controller). In this case, the SRAM interface 42 functions as a mediation circuit. In other words, the SRAM interface 42 mediates accesses from the DMAC1 (accesses from the BUS1 side), accesses from the processing section 60, and accesses from the DMAC2 (accesses from the BUS2 side). A data path is established between the SRAM 40 and one of the DMAC1, the DMAC2, and the processing section 60, based on the mediation result.

Note that the SRAM 40 is preferably provided within the data transfer control device but it could also be provided outside of the data transfer control device.

The storage area of the SRAM 40 could be divided into a header area (control information area) and a data area, or into a transmission area and a reception area. It could also be divided into an asynchronous area and an isochronous area.

The SDRAM 50 (generally speaking: a second memory, cache memory, or synchronization type of memory), on the other hand, has a larger capacity than the SRAM 40. It is a memory that can be accessed sequentially (in which access to sequential addresses can be done) at a higher speed than random access (or the SRAM 40), it is also a memory that enables the input and output of data (burst data) with sequential addresses, in synchronization with a clock. This SDRAM 50 functions as a cache memory for isochronous data.

Note that the SDRAM 50 is preferably provided outside of the data transfer control device but it could also be provided within the data transfer control device. Instead of ordinary SDRAM, other high-speed synchronized types of memory such as DDR SDRAM or SDRAM made by the Rambus company could be used therefor.

The storage area of the SDRAM 50 could be divided into a transmission area and a reception area, or into an asynchronous area and an isochronous area.

The data transfer control device comprises the DMAC1 (generally speaking: a first memory access control circuit) This DMAC1 performs processing for writing packets (data and headers) from the first bus BUS1 side (the 1394 interface 31) to the SRAM 40. It also performs processing for reading data (isochronous data.) that has been written to the SRAM 40 and transferring packets (isochronous packets) assembled from this data and headers, to the BUS1 side.

More specifically, the DMAC1 generates write requests and write addresses during writes to the SRAM 40. Similarly, it generates read requests and read addresses during reads from the SRAM 40. This implements DMA transfer between the SRAM 40 and the 1394 interface 31 (BUS1), without involving the processing section 60.

The data transfer control device comprises the DMAC2 (generally speaking: a second memory access control circuit) This DMAC2 performs processing to read isochronous data that has been written to the SRAM 40 and write the thus-read data to the SDRAM 50, which has a larger capacity than the SRAM 40. It also performs processing to read isochronous data that has been written to the SDRAM 50 and write the thus-read isochronous data to the SRAM 40.

More specifically, the DMAC2 generates read requests and read addresses during reads from the SRAM 40 or the SDRAM 50. Similarly, it generates write requests and write addresses during writes to the SRAM 40 or the SDRAM 50. This implements DMA transfer between the SRAM 40 and the SDRAM 50, without involving the processing section 60.

The data transfer control device comprises a DMAC3 (generally speaking: a third memory access control circuit) This DMAC3 performs processing for reading isochronous data that has been written to the SDRAM 50 and transferring the thus-read isochronous data to the BUS2 side (the IDE interface 34). It also performs processing for writing the isochronous data that has been transferred from the BUS2 side to the SDRAM 50.

More specifically, the DMAC3 generates read requests and read addresses during reads from the SDRAM 50. Similarly, it generates write requests and write addresses during writes to the SDRAM 50. This implements DMA transfer between the SDRAM 50 and the BUS2 (the IDE interface 34), without involving the processing section 60.

The DMAC1 comprises a first encryption/decryption circuit ENC/DEC1 (on the 1394 side). This ENC/DEC1 performs processing for encrypting data (isochronous data) that has been read from the SRAM 40 in accordance with a first encryption process, for transfer to the BUS1 side. It also performs processing for decrypting encrypted data (encrypted isochronous data) that has been transferred from the BUS1 side in accordance with a first decryption process, for writing to the SRAM 40.

In such a case, processing such as that in accordance with Digital Transmission Content Protection (DTCP), which is an encryption standard under IEEE 1394, could be utilized as the first encryption process (decryption process).

In this case, DTCP (5C DTCP) is a standard for the transmission of encrypted data between electronic instruments (devices) connected by IEEE 1394. Before encrypted data that ought to be protected is transmitted between electronic instruments, this DTCP enables certification to verify whether or not the electronic instrument on the reception side is provided with a data protection mechanism. If it is verified by the certification processing that a protection mechanism is provided, a key for unlocking the encryption is exchanged between the electronic instruments. The electronic instrument on the transmission side transmits the encrypted data and the electronic instrument on the reception side decrypts the thus-received encrypted data.

This configuration makes it possible to transmit protected data between electronic instruments conforming to DTCP. This enables protection of data contents from an electronic instrument that does not have a protection mechanism or an electronic instrument that attempts to modify the data.

This DTCP also provides for the exchange between electronic instruments of copy control information that has been set by a contents provider. This enables copy control such as "copy prohibited", "single copy enabled", and "freely copyable". Revision information (system renewability messages) can be distributed together with the contents. This makes it possible to prohibit and suppress the transfer of data to illegal electronic instruments and inhibit illegal copying in the future. In addition, this DTCP is expected to be utilized not only with IEEE 1394, but also as the USB encryption standard.

Note that the DTCP encryption and decryption processes are described in detail on the homepage of the Digital Transmission Licensing administrator (DTLA).

The DMAC2 comprises a second (IDE side) encryption/decryption circuit ENC/DEC2. This ENC/DEC2 performs processing to encrypt data (isochronous data, or data transferred from the BUS1 side) that has been read from the SRAM 40 in accordance with a second encryption process, for writing to the SDRAM 50. It also performs processing to decrypt encrypted data (encrypted isochronous data) in accordance with a second decryption process, for transfer to the SRAM 40 (processing for transfer to the BUS1 side).

In such a case, processing such as that in accordance with the Data Encryption Standard (DES), which is a common-key encryption method, could be utilized as the second encryption process (decryption process).

Common-key encryption methods are encryption methods that are widely used in fields such as the financial world. These common-key encryption methods use the same key for encryption and decryption. Among the common-key encryption methods, DES is the most widely used.

This DES uses 16-stage iterations of non-linear conversion (sbox) and transposition processing for blocks of 64 bits of data. A 48-bit sub-key is used in the processing at each stage, where these sub-keys are created from a 64-bit common key.

Within DES are single DES (SDES) and triple DES (TDES). TDES is an encryption method wherein the SDES algorithm is repeated three times. This TDES enables the appropriation of the SDES algorithm and, since it achieves an effect similar to increasing the length of the encryption key, it enables an increase in the strength of the encryption in a comparatively simple manner.

Note that the data transfer control device of this embodiment can also be applied to the Advanced Encryption standard (AES), which is a common-key encryption method that supersedes DES, in addition to DES (single DES or triple DES).

The data transfer control device comprises the processing section 60. This processing section 60 controls the various circuits and units (components) within the device and also provides overall control of the device. The functions of the processing section 60 could be implemented by hardware such as a CPU or system controller (ASIC) or by firmware (a program). Note that processing section 60 could be provided outside of the data transfer control device.

The data transfer control device comprises a memory pointer management circuit 70. This memory pointer management circuit 70 is a circuit for managing read and write pointers (pointers indicating addresses in memory) of the SRAM 40 (or the SDRAM 50). The DMAC1 and DMAC2 use the pointers managed (controlled) by the memory pointer management circuit 70 to generate memory addresses and implement DNA transfers.

An automatic DNA determination circuit 72 (generally speaking: a automatic memory access determination circuit) comprised by the memory pointer management circuit 70 is a circuit that determines whether or not the quantity of received data in the SRAM 40 has exceeded a given transfer unit (transfer data quantity). If the quantity of reception data has exceeded the given transfer unit (for example, N bytes), this the automatic DNA determination circuit 72 makes an automatic DMA (memory access) start signal go active. This ensures that the DMAC2 reads the above described transfer unit of data (isochronous data) from the reception data area of the SRAM 40, and transfers it to the SDRAM 50 (BUS2) side. The ENC/DEC2 encrypts the data in the above described transfer units.

The data transfer control device comprises a transfer number reservation register TNREG. This transfer number reservation register TNREG is a register that the processing section 60 uses for reserving the number of transfers required for an isochronous packet (generally speaking: a packet) comprising isochronous data.

In other words, the DMAC1 reads isochronous packet (isochronous data and isochronous header) from the SRAM 40. It then performs processing for transferring the thus-read isochronous packet automatically at each isochronous transfer cycle (125 μs) to the BUS1 side (transfers without involving the processing section 60), until the number of transfers reserved in TNREG reaches zero.

Note that if the number of transfers reserved in TNREG reaches zero, the automatic transfer is halted at the next isochronous transfer cycle and an interrupt is outputted to the processing section 60.

The TNREG comprises a transfer number reservation register TNREGK for the page area of the Kth (where K=0, by way of example) header area of the SRAM 40 and a transfer number reservation register TNREGL for the page area of the Lth (where L=1, by way of example) header area.

When the processing section 60 is preparing the isochronous header to be written to the Kth page area, the DMAC1 reads the isochronous header written to the Lth page area and the isochronous data written to the data area, from the SRAM 40. Isochronous packets configured of the thus-read isochronous header and isochronous data are then transferred automatically to the BUS1 side, until the reserved number of transfers in TNREGL reaches zero.

When the processing section 60 is preparing the isochronous header to be written to the Lth page area, the DMAC1 reads the isochronous header that is written to the Kth page area and the isochronous data that is written to the data area, from the SRAM 40. Isochronous packets configured of the thus-read isochronous header and isochronous data are then transferred automatically to the BUS1 side, until the reserved number of transfers in TNREGK reaches zero.

Figure 4:
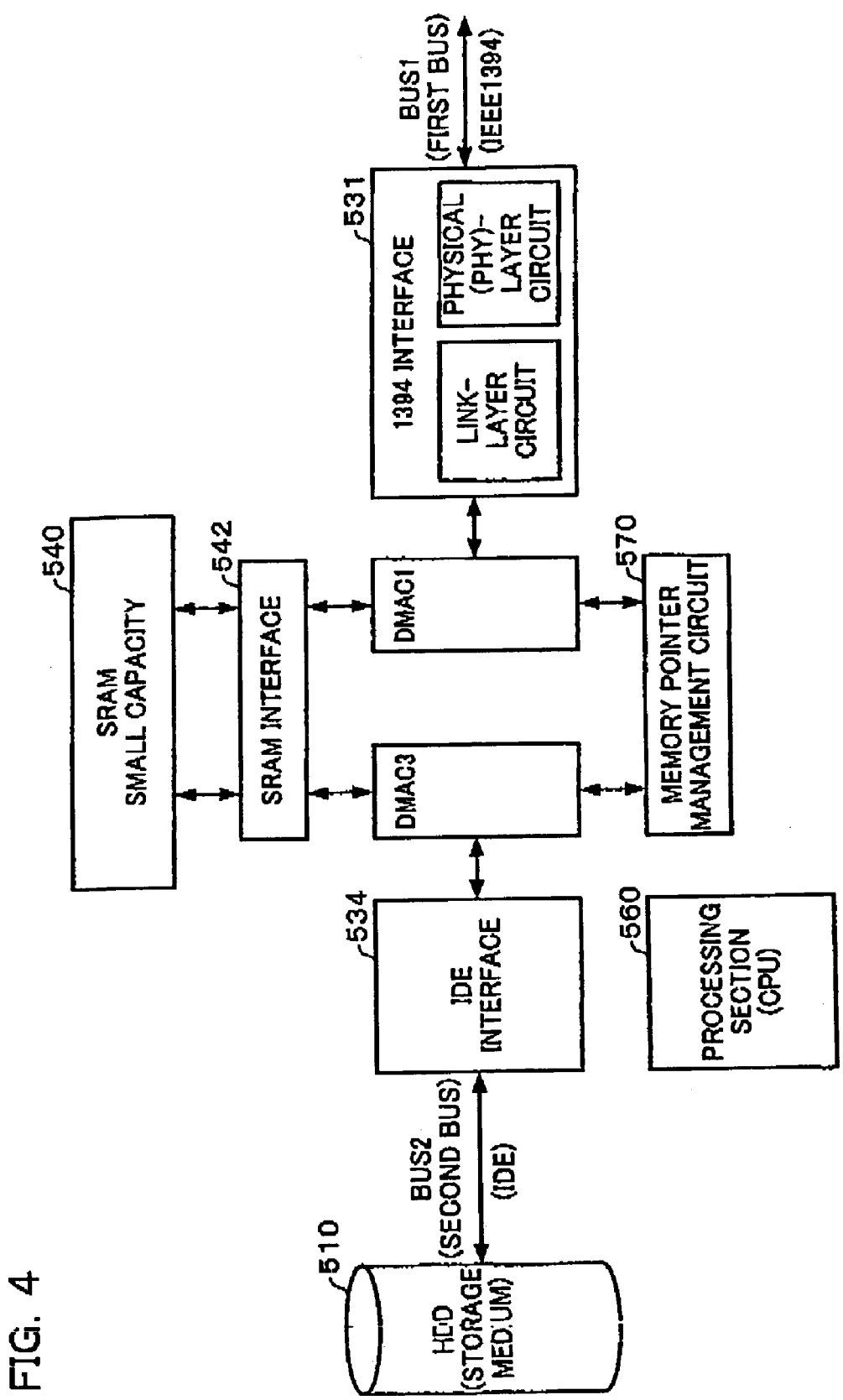
FIG. 4 shows an example of the configuration of the data transfer control device of a comparative example.

A data transfer control device in accordance with a comparative example is shown in FIG. 4.

The main difference between FIGS. 3 and 4 is the lack of components such as the DMAC2 that implement DA transfer between SRAM and SDRAM, the SDRAM interface 52, the transfer number reservation register TNREG, and the automatic DMA determination circuit 72.

The configuration of the comparative example of FIG. 4 is suitable for the transfer of file data in a personal computer. For high-speed transfer of AV data, however, the configuration of this embodiment as shown in FIG. 3 is more appropriate.

In other words, IEEE 1394 enables the transfer of AV data by an isochronous method. In such a case, the isochronous transfer transfers isochronous packets without breaks, at a fixed transfer rate or higher. With the reading or writing of data with respect to an HDD 510, on the other hand, it is necessary to have an access time (head seek time) of a fixed length. Thus, with a configuration in which only a small-capacity SRAM 540 is provided, as in FIG. 4, it is not possible to provide slack-absorbing buffering of isochronous packets that are to be transferred without breaks. In other words, if there is any delay in the processing of writing to the HDD 510, due to the head seek time, it will not be possible to receive isochronous packets. If there is any delay in reading from the HDD 510, it will be impossible to transmit isochronous packets.

In contrast thereto, the configuration of this embodiment shown in FIG. 3 uses the SDRAM 50 that functions as a cache memory, to buffer the isochronous data. This therefore enables slack-absorbing buffering of the isochronous data to be transferred without breaks, even if there is some delay in the write processing or read processing with respect to the HDD 10, making it possible to guarantee data continuity. In other words, it is possible to increase the reproduction capabilities for AV data, by using the inexpensive SDRAM 50 (which can be obtained easily) to cache the isochronous data, thus guaranteeing the data transfer rate.

In particular, a fixed quantity of data is transferred sequentially by isochronous transfer. In other words, this is transfer by which a certain quantity of continuous image data or sound data is transferred as a batch. With FIG. 3, therefore, the use of the SDRAM 50 that can perform rapid sequential access (access to sequential addresses) as cache memory for isochronous data makes it possible to implement efficient buffering of the isochronous data.

Processing such as data classification is done by the SRAM 40. The processing section 60 randomly accesses desired addresses of the SRAM 40 and performs packet processing to write the header of the packet to be transferred and analyze the packet. Thus, use of the SRAM 40, which can perform random accesses faster than the SDRAM 50, as memory for classification processing and packet processing makes it possible to implement efficient classification processing and packet processing.

In this embodiment shown in FIG. 3, the SEAM 40 is used as memory for data classification processing and packet processing and the SDRAM 50 is used as cache memory for isochronous data, which enables a form of memory usage that has not been possible up to now. This enables the implementation of efficient data transfer processing that is not possible with the configuration of FIG. 4.

4. Data Transfer Control Method

The data transfer control method of this embodiment will now be described with reference to FIGS. 5A, 5B, 6A, and 6B.

In the embodiment shown in FIG. 5A, the storage area of the SRAM (first memory) is divided into an area for storing isochronous data and another area.

During reception, as shown in FIG. 5A, the DMAC1 selects an isochronous packet from the packets transferred to the BUS1 side, and writes the isochronous data comprised within the isochronous packet to the isochronous data area of the SRAM 40. During this time, the first encryption/decryption circuit ENC/DEC1 decrypts the encrypted data in accordance with DTCP or the like. It then writes the decrypted data to the isochronous data area of the SRAM 40.

Next, the DMAC2 reads the isochronous data from the isochronous data area of the SRAM 40 and writes it to the SDRAM 50 (the second memory). During this time, the second encryption/decryption circuit ENC/DEC2 encrypts the isochronous data that has been read from the SRAM 40, in accordance with DES or the like. It then writes the encrypted data to the SDRAM 50.

The execution of this encryption process makes it possible to maintain the confidentiality of the isochronous data (digital contents) that has been written to the SDRAM 50, thus enabling the implementation of copyright protection.

The DMAC3 then reads the encrypted isochronous data from the SDRAM 50 and transfers it to the BUS2 side. The configuration is such that the isochronous data (TS packets) encrypted by DES in this manner are stored on the HDD 10.

Note that the storage area of the SRAM 40 is preferably divided into an isochronous data area and an asynchronous data area, as shown in FIG. 5B.

In such a case, the DMAC1 selects a packet to be transferred from the BUS1 side, writes isochronous data to the isochronous data area, and writes asynchronous data to the asynchronous data area. The DMAC2 reads only the isochronous data that has been written to the isochronous data area, and writes it to the SDRAM 50.

The storage area of the SRAM 40 could also be divided into an isochronous transmission data area, an isochronous reception data area, an asynchronous transmission data area, and an asynchronous reception data area, as shown in FIG. 5C. Similarly, the storage area of the SDRAM 50 could be divided into an isochronous transmission data area and an isochronous reception data area.

In such a case, the DMAC1 writes isochronous data to the isochronous data area and asynchronous data to the asynchronous data area. The DMAC2 then reads the isochronous data from the SRAM 40 and writes it to the isochronous reception data area of the SDRAM 50. The DMAC3 reads the isochronous data from the isochronous reception data area of the SDRAM 50 and transfers it to the BUS2 side.

During transmission, as shown in FIG. 6A, the DMAC3 writes isochronous data (TS packets) from the BUS2 side (the HDD 10) to the SDRAM 50.

The DMAC2 then reads the isochronous data from the SDRAM 50 and writes it to the isochronous data area of the SRAM 40. During this time, the second encryption/decryption circuit ENC/DEC2 decrypts the encrypted data by DES. It then writes the decrypted data to the isochronous data area of the SRAM 40.

The DMAC1 then reads the isochronous data from the isochronous data area of the SRAM 40 and transfers it to the BUS1 side. During this time, the first encryption/decryption circuit ENC/DEC1 encrypts the isochronous data read from the SRAM 40 in accordance with DTCP or the like. It then transfers the encrypted data over BUS1.

The execution of this DTCP encryption process makes it possible to maintain the confidentiality of the isochronous data (digital contents) over IEEE 1394, thus enabling the implementation of copyright protection.

Note that if the storage area of the SRAM 40 is divided into an isochronous data area and an asynchronous data area, the data transfer could be done as shown in FIG. 6B. If the storage areas of the SRAM 40 and the SDRAM 50 are divided into a transmission data area and a reception data area, the data transfer could be done as shown in FIG. 6C.

If the isochronous data area and asynchronous data area are not separated for the transfer of AV data, it would be difficult to classify the AV data (AV stream) and AV commands (AV/C protocol commands).

Since the storage area of the SRAM 40 of this embodiment is divided into an isochronous data area and an asynchronous data area, as shown in FIGS. 5B and 5B, it is simple to classify AV data and AV commands. This makes it possible to transfer only the AV data that has been received from the BUS1 (IEEE 1394) side automatically to the BUS2 (IDE) side, enabling the implementation of efficient AV data transfer that does not place any load on the processing section 60.

With this embodiment, the storage areas of the SRAM 40 and the SDRAM 50 are each divided into a transmission data area and a reception data area, as shown in FIGS. 5C and 6C. This makes it possible to transmit and receive isochronous data independently. It is therefore possible to simultaneously guarantee the transfer rates for the transmission and reception of isochronous data. As a result, it is simple to implement time-shifted reproduction in which image data is read and reproduced from the HDD 10 while other image data is being stored on the HDD 10.

Figure 7:
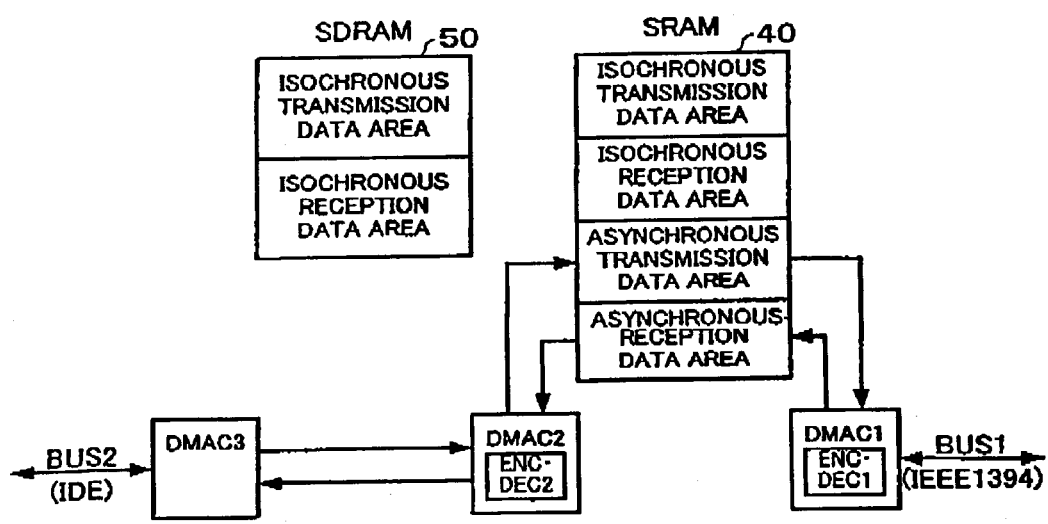
FIG. 7 is illustrative of the data transfer control method for the transfer of asynchronous data.

Note that if asynchronous data is stored on the HDD 10, the data transfer could be as shown in FIG. 7. In other words, the data transfer path of the SDRAM 50 would be bypassed, so that asynchronous data is transferred directly between the DMAC2 and DMAC3.

In such a case, the isochronous data can accumulate unchanged in the SDRAM 50, waiting until the transfer of asynchronous data has ended. When the transfer of asynchronous data ends, the data transfer control device is reconnected to the SDRAM 50 on the outside. The isochronous data collected in the SDRAM 50 is transferred by the method described with reference to FIGS. 5A to 6C, and the transfer could be restarted.

In general, asynchronous transfer is used when the HDD 10 is to be used as a personal computer (PC) file system. If AV data is to be stored in the HDD 10, on the other hand, isochronous transfer is used.

As shown by this embodiment, the storage area of the SRAM 40 is divided into an isochronous data area and an asynchronous data area, and also the SDRAM 50 is removed from the DMA transfer path during asynchronous transfer, so that both AV data and PC file data can be stored on the HDD 10. In other words, when AV data that is isochronous data is being transferred, the data transfer could be done through the isochronous data area using the method shown in FIGS. 5A to 6C. When PC file data that is asynchronous data is being transferred, on the other hand, the SDRAM 50 could be removed from the DMA transfer path and data is transferred through the asynchronous data area.

This makes it possible to provide the user with a usage state in which it seems that both an HDD for AV data and an HDD for PC use are connected.

Figure 8A:
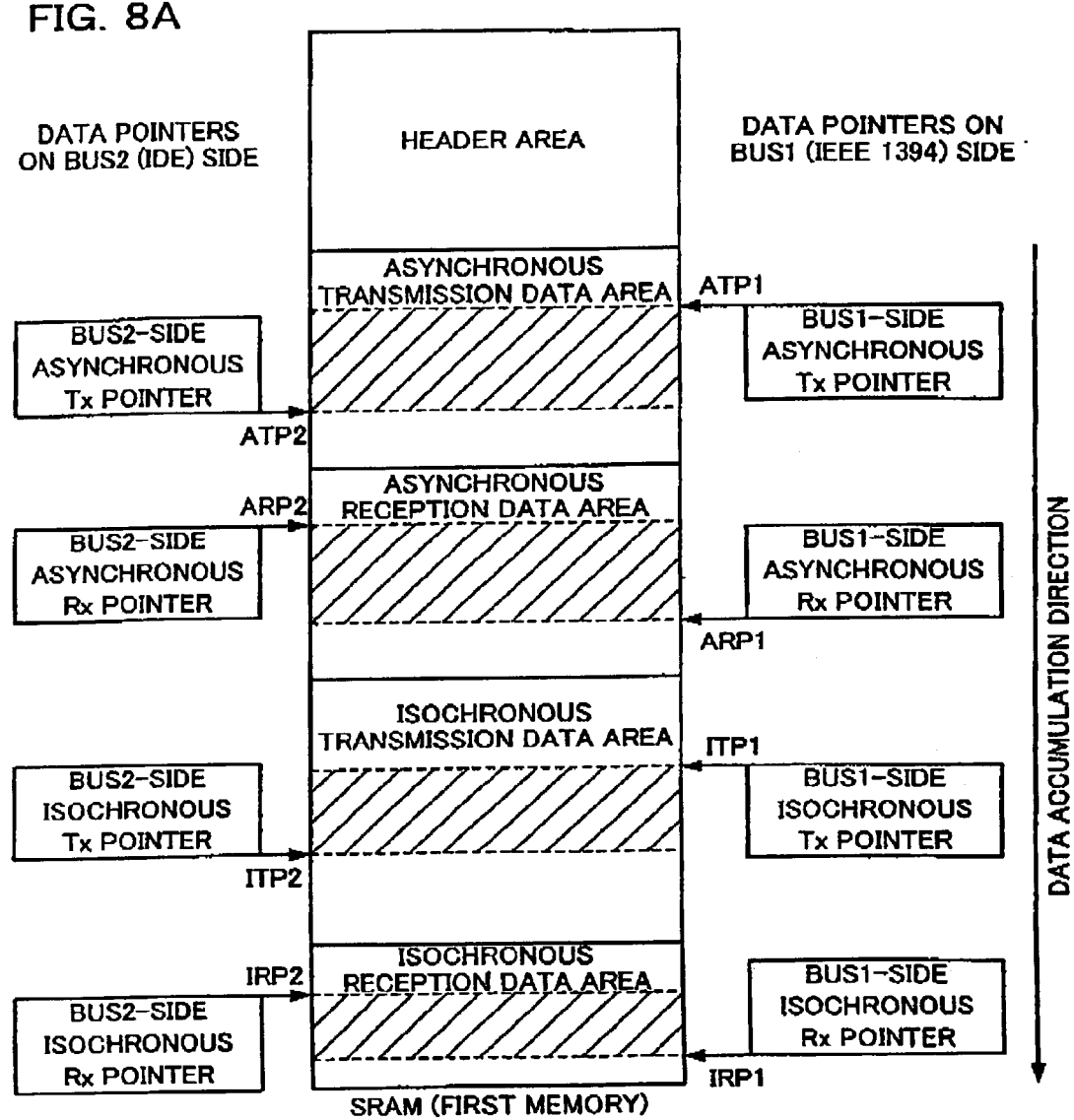
FIGS. 8A and 8B show examples of the memory maps of the SRAM and SDRAM.
Figure 8B:
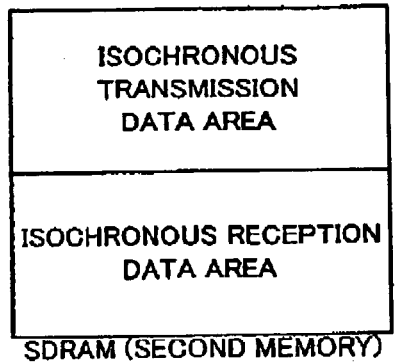

Detailed examples of the memory maps of the SRAM 40 and the SDRAM 50 as shown in FIGS. 8A and 8B.

FIG. 8A shows how the storage area of the SRAM 40 is divided into a header area, an asynchronous transmission data area, an asynchronous reception data area, an isochronous transmission data area, and an isochronous reception data area. Similarly, FIG. 8B shows how the storage area of the SDRAM 50 is divided into an isochronous transmission data area and an isochronous reception data area. Note that areas other than those shown in FIGS. 8A and 8B could be provided as the storage areas of the SRAM 40 and SDRAM 50.

In FIG. 8A, ATP1 (BUS1-side asynchronous Tx pointer) is provided as a read pointer for the asynchronous transmission data area, and ATP2 (BUS2-side asynchronous Tx pointer) is provided as a write pointer therefor.

Similarly, ARP1 (BUS1-side asynchronous Rx pointer) is provided as a write pointer for the asynchronous reception data area and ARP2 (BUS2-side asynchronous Rx pointer) is provided as a read pointer therefor.

Furthermore, ITP1 (BUS1-side isochronous Tx pointer) is provided as a read pointer for the isochronous transmission data area and ITP2 (BUS2-side isochronous Tx pointer) is provided as a write pointer therefor.

In addition, IRP1 (BUS1-side isochronous Rx pointer) is provided as a write pointer for the isochronous reception data area and IRP2 (BUS2-side isochronous Rx pointer) is provided as a read pointer therefor.

These pointers are managed (set and updated) by the memory pointer management circuit 70 of FIG. 3. The use of these pointers makes it possible to implement efficient reading and writing of data.

Note that AV/C protocol commands are written to the asynchronous transmission data area of FIG. 8A during transmission, or to the asynchronous reception data area during reception. These AV/C protocol commands are commands for controlling the AV device (reproduction and stop, etc.) and for status enquiries.

The areas shown in FIGS. 8A and 8B are in a configuration called a ring buffer. In other words, information (data and headers) is stored from one boundary (start address) of each area to the other boundary (end address) thereof, and once that other boundary has been reached, information is stored again from that first boundary.

5. External Connection of SDRAM

With this embodiment, the SRAM40 (first memory) is provided within the data transfer control device 30 (integrated circuit) and the SDRAM 50 (second memory) is provided outside of the data transfer control device 30 (IC), as shown in FIGS. 9A and 9B. The SDRAM 50 is connected to external terminals of the data transfer control device 30.

The configuration shown in FIGS. 9A and 9B makes it unnecessary to provide the SDRAM 50 within the IC of the data transfer control device 30, thus enabling a reduction in the chip area of the IC. This makes it possible to use an inexpensive general-purpose SDRAM 50, enabling a reduction in the cost of the electronic instrument.

However, if the SDRAM 50 is provided on the outside, there is a danger concerning leakage of the confidentiality of the isochronous data.

With this embodiment of the present invention, the configuration is such that only data that has been encrypted by DES or the like (a second encryption process) is input or output through the external terminals of the data transfer control device 30.

Specifically, during reception, as shown by way of example in FIG. 9A. The DMAC2 reads data from the SRAM 40 (the BUS1 side) and the ENC/DEC2 encrypts the thus-read data by DES (generally speaking: a second encryption process). The DMAC2 writes the encrypted data to the SDRAM 50 through the external terminals (data terminals) of the data transfer control device 30.

The DMAC3 then reads the encrypted data that has been written to the SDRAM 50 out through the external terminals of the data transfer control device 30, and transfers the thus-read encrypted data to the BUS2 side to which the HDD 10 (storage medium) or the like is connected.

During transmission, on the other hand, the DMAC3 reads data that has been encrypted by DES from the HDD 10 through the BUS2, as shown in FIG. 9B. The data is written to the SDRAM 50 through the external terminals of the data transfer control device 30.

The DMAC2 reads the encrypted data that has been written to the SDRAM 50 through the external terminals of the data transfer control device 30, and the ENC/DEC2 uses the DES decryption process to decrypt the thus-read encrypted data. The DMAC2 writes the decrypted data to the SRAM 40 (transfer to the BUS1 side).

Note that the ENC/DEC1 decrypts the data that has been encrypted by IEEE 1394 DTCP (generally speaking: a first encryption process) during reception, as shown in FIG. 9A. The DMAC1 writes the decrypted data to the SRAM 40.

During the transmission of FIG. 9B, on the other hand, the DMAC1 reads data from the SRAM 40 and the ENC/DEC1 encrypts the thus-read data by DTCP. The DMAC1 then transfers the encrypted data to the BUS1 side.

In the above described manner, only encrypted data is input or output through the external terminals (data terminals) of the data transfer control device 30. This maintains the confidentiality of the data and enables the implementation of copyright protection for the data contents.

Data confidentiality can be further increased by ensuring that only encrypted data is stored in the SDRAM 50.

The provision of the ENC/DEC1 and ENC/DEC2 of FIGS. 9A and 9B ensures that only decrypted data is stored in the SRAM 40 at all times. This makes it possible for the processing section 60 to use the SRAM 40 for packet processing (packet analysis and packet preparation).

Note that encryption might not be necessary, depending on the data contents. For example, in some cases copyright protection will not be required it the contents are distributed as analog data, making encryption unnecessary.

There is a danger that the execution of encryption/decryption processing by the ENC/DEC2 will reduce the transfer speed by an equivalent amount.

With this embodiment, paths are provided for bypassing the encryption/decryption processes.

More specifically, during the reception shown in FIG. 9A, the DMAC2 (second memory access control circuit) uses a bypass path 62 to bypass the DES encryption process (second encryption process) for data for which encryption is not necessary. Data that has been read from the SRAM 40 (data from the BUS1 side) is written directly to the SDRAM 50 without passing through the ENC/DEC2, by way of example.

During the transmission shown in FIG. 9B, similarly, the DMAC2 uses the bypass path 62 to bypass the DES decryption process (second decryption process) when decryption is not necessary. Data read from the SDRAM 50 is written directly to the SRAM 40 without passing through the ENC/DEC2 (transfer to the BUS1 side).

This makes it possible to avoid unnecessary encryption and decryption processing for data (contents) that does not require copyright protection. As a result, the effective transfer rate of the data transfer can be increased.

Note that a configuration in which the SRAM 40 (internal memory) is not provided could be used when encrypted data is input or output with respect to the SDRAM 50 (external memory) through the external terminals of the data transfer control device 30, as shown in FIGS. 10A and 10B.

For example, during reception as shown in FIG. 10A, the ENC/DEC2 comprised by the DMAC2 encrypts data transferred from the BUS1 side (the 1394 interface 31) by DES (second encryption process). The DMAC2 writes the thus-encrypted data to the SDRAM 50. The DMAC3 reads the encrypted data from the SDRAM 50 and transfers it to the BUS2 side (the IDE interface 34).

During transmission as shown in FIG. 10B, the DMAC3 writes encrypted data transferred from the BUS2 side (the IDE interface 34) to the SDRAM 50. The DMAC2 reads the encrypted data from the SDRAM 50 and the ENC/DEC2 decrypts the thus-read data. The DMAC2 transfers the decrypted data to the BUS1 side (the 1394 interface 31).

Note that DTCP encryption/decryption processing could also be done by the ENC/DEC2 or by the 1394 interface 31.

6. Detailed Configurational Example

Figure 11:
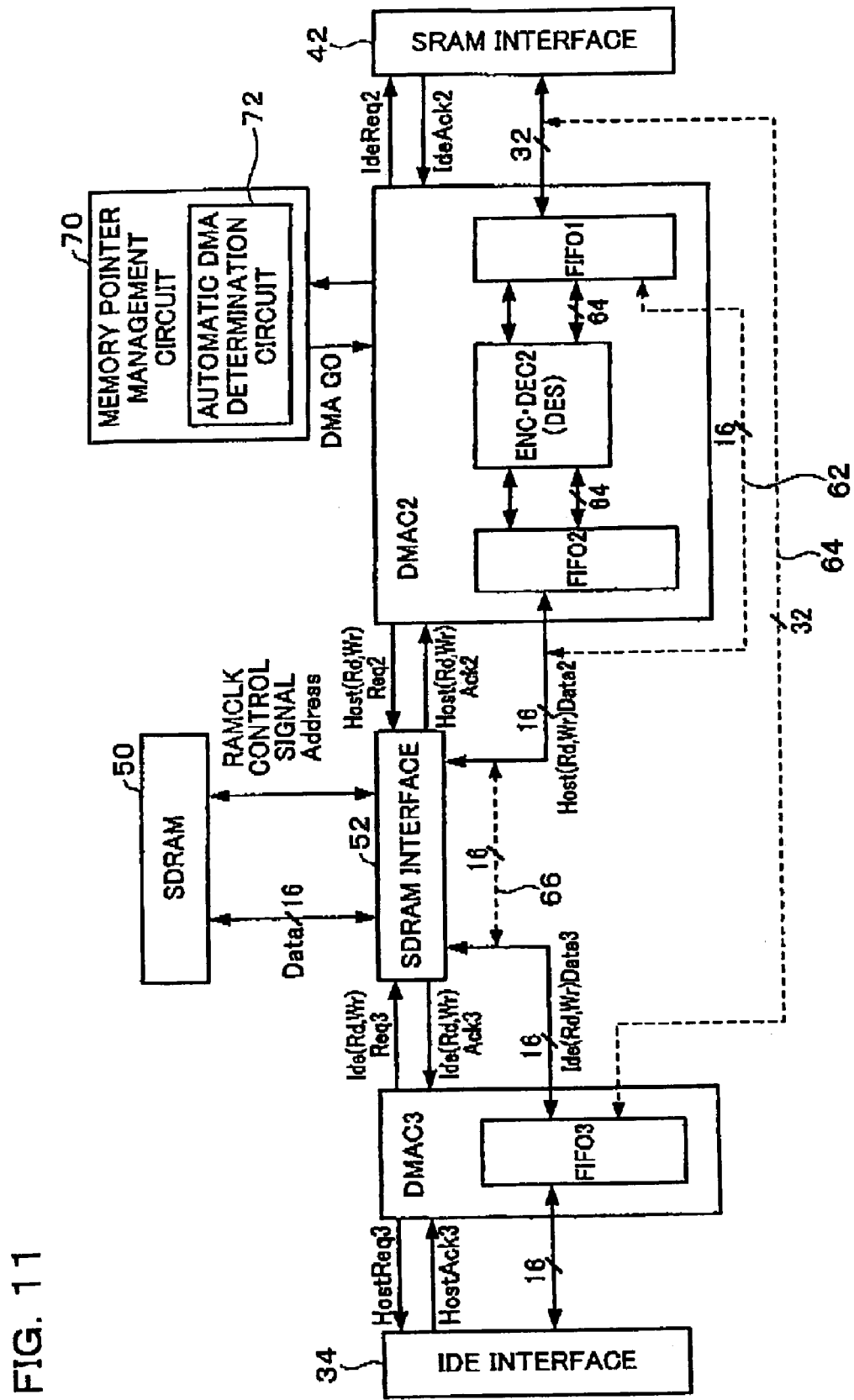
FIG. 11 shows a detailed configurational example of the data transfer control device.
Figure 12:
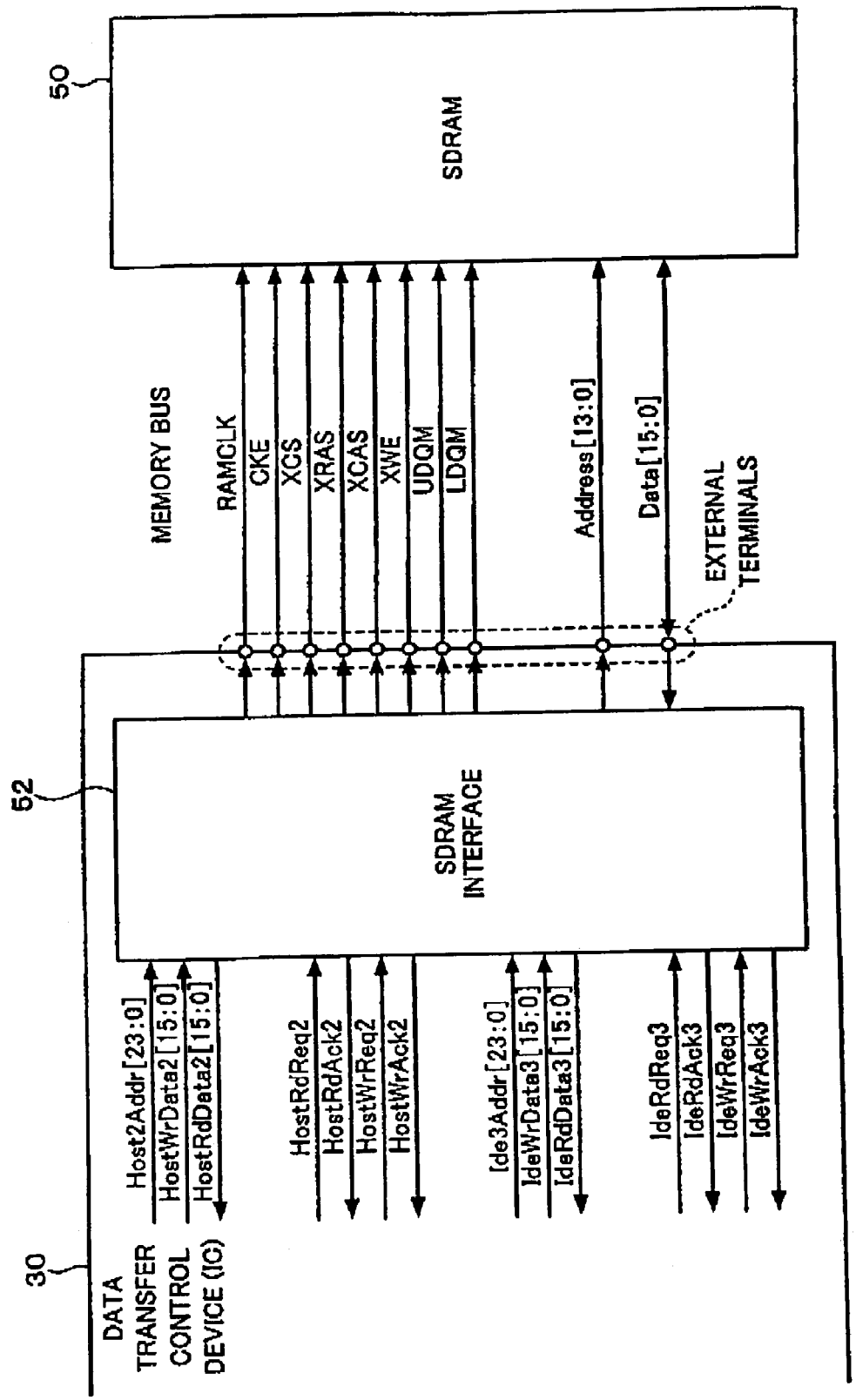
FIG. 12 shows a detailed configurational example of the data transfer control device.

An example of details of the configuration and connections of the DMAC2, the SDRAM interface 52, and the DMAC3 is shown in FIGS. 11 and 12.

The meanings of the various signals used in FIGS. 11 and 12 are shown in FIGS. 13A, 13B, and 13C. Note that IdeReq2 in FIG. 11 is an access (read or write) signal from the DMAC2 to the SRAM 40 and IdeAck2 is an access acknowledgement signal. Similarly, HostReq3 is an access request signal from the DMAC3 to the IDE side and HostAck3 is an access acknowledgement signal. DMAGO is an automatic DMA start signal.

As shown in FIG. 11, the DMAC2 comprises a FIFO1, the ENC/DEC2, and a FIFO2. During reception, data that has been read from the SRAM 40 through the SRAM interface 42 accumulates temporarily in the FIFO1. The FIFO1 outputs that data to the ENC/DEC2. The ENC/DEC2 encrypts the data and the encrypted data accumulates in the FIFO2. The FIFO2 sends the accumulated data to the SDRAM 50.

During transmission, on the other hand, data that has been read from the SDRAM 50 through the SDRAM interface 52 accumulates temporarily in the FIFO2. The FIFO2 outputs that data to the ENC/DEC2. The ENC/DEC2 decrypts the data and the decrypted data accumulates in the FIFO1. The FIFO1 sends the accumulated data to the SRAM 40.

Note that if encryption is not performed on the data, the data read from the SRAM40 is sent directly to the SDRAM 50 through the bypass path 62. Similarly, if decryption is not performed on the data, the data read from the SDRAM 50 is sent directly to the SRAM 40 through the bypass path 62.

The DMAC2 starts DMA when the automatic DMA start signal from the memory pointer management circuit 70 (the automatic DMA determination circuit 72) becomes active.

The DMAC3 comprises a FIPO3, as shown in FIG. 11. During reception, the data read from the SDRAM 50 accumulates temporarily in the FIFO3 before being sent to the IDE side. During transmission, on the other hand, the data from the IDE side accumulates temporarily in the FIFO3 before being sent to the SDRAM 50.

Note that a path 64 is a bypass path for when the ENC/DEC2 and SDRAM 50 are not used. If neither the SDRAM 50 nor the encryption process is necessary, this bypass path 64 is selected for the data transfer. A path 66 is a bypass path for when the SDRAM 50 is not used. If the SDRAM 50 is not required (during asynchronous data transfer, for example) this bypass path 66 is selected for the data transfer.

The data transfer control device 30 and the SDRAM 50 use a synchronization clock signal RAMCLK, control signals CKE, XCS, XRAS, XCAS, XWE, UDQM, and LDQM, and an address signal Address to transfer data Data, as shown in FIG. 12. Note that the meanings of these signals are shown in FIG. 13A.

Specifically, the data transfer control device 30 uses the control signals (on the memory bus) to set various operating modes (commands) and a start address in the SDRAM 50. When that happens, the SDRAM 50 inputs or outputs data (burst data) at high speed from addresses sequential to the start address, in synchronization with RAMCLK. In other words, the SDRAM 50 generates addresses automatically within itself, and accesses internal memory blocks based on the thus-generated addresses. Note that in this case a clock signal that is faster than RAMCLK could be generated internally, for accessing internal memory blocks.

Figure 14A:
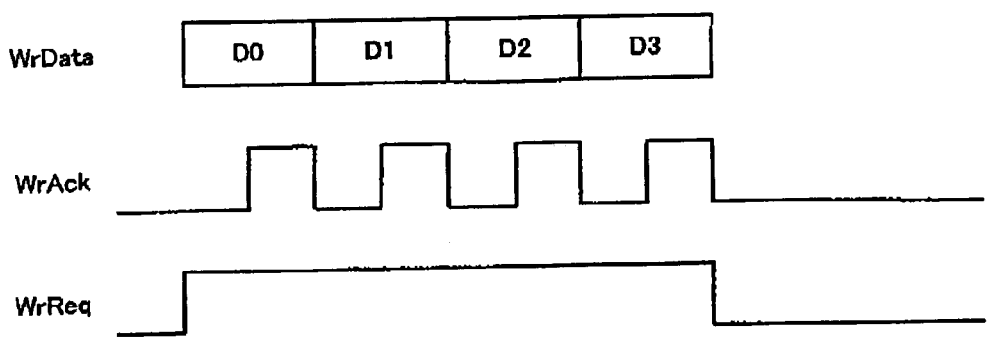
FIGS. 14A and 14B show the timing waveforms of the signals.
Figure 14B:
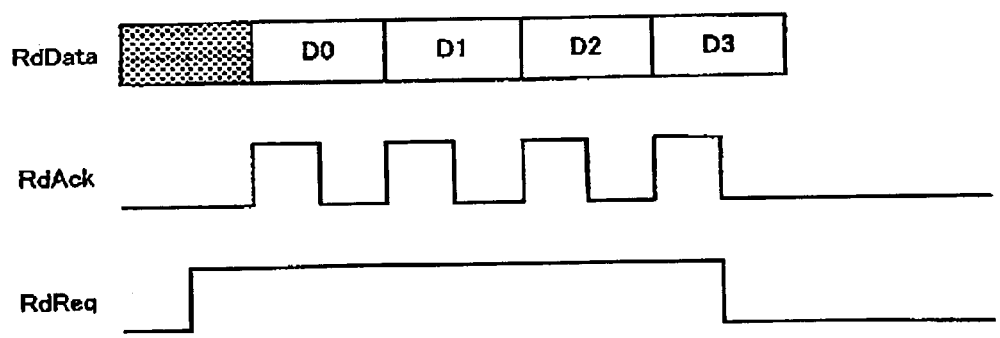

Timing waveforms in FIGS. 14A and 14B are examples of the write data WrData, write acknowledgement signal WrAck, write request signal WrReq, read data RdData, read acknowledgement signal RdAck, and read request signal RdReq of FIGS. 13B and 13C.

7. Operation of Data Transfer Control Device

Figure 15:
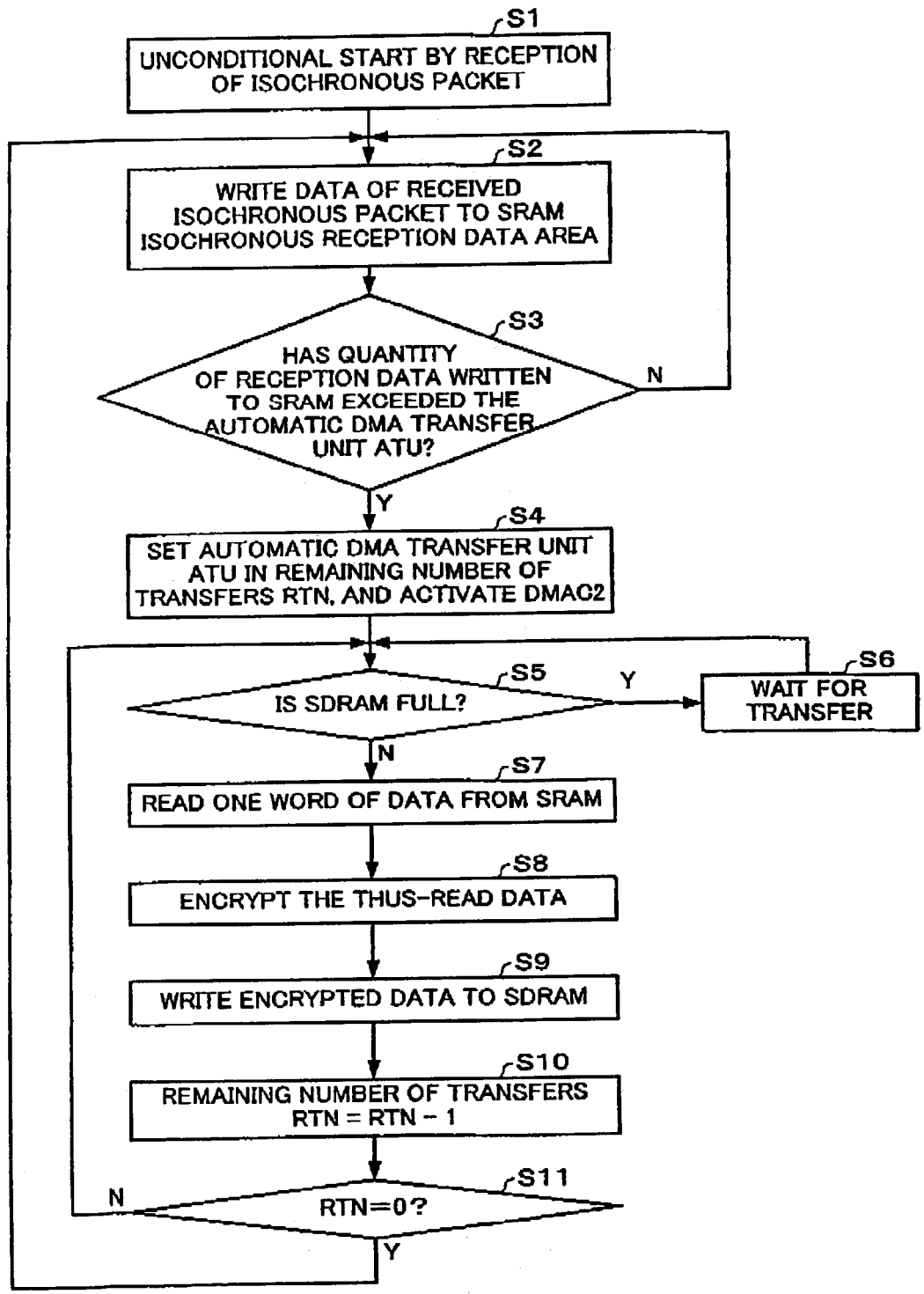
FIG. 15 is a flowchart illustrative of the operation according to one embodiment of the present invention.
Figure 16:
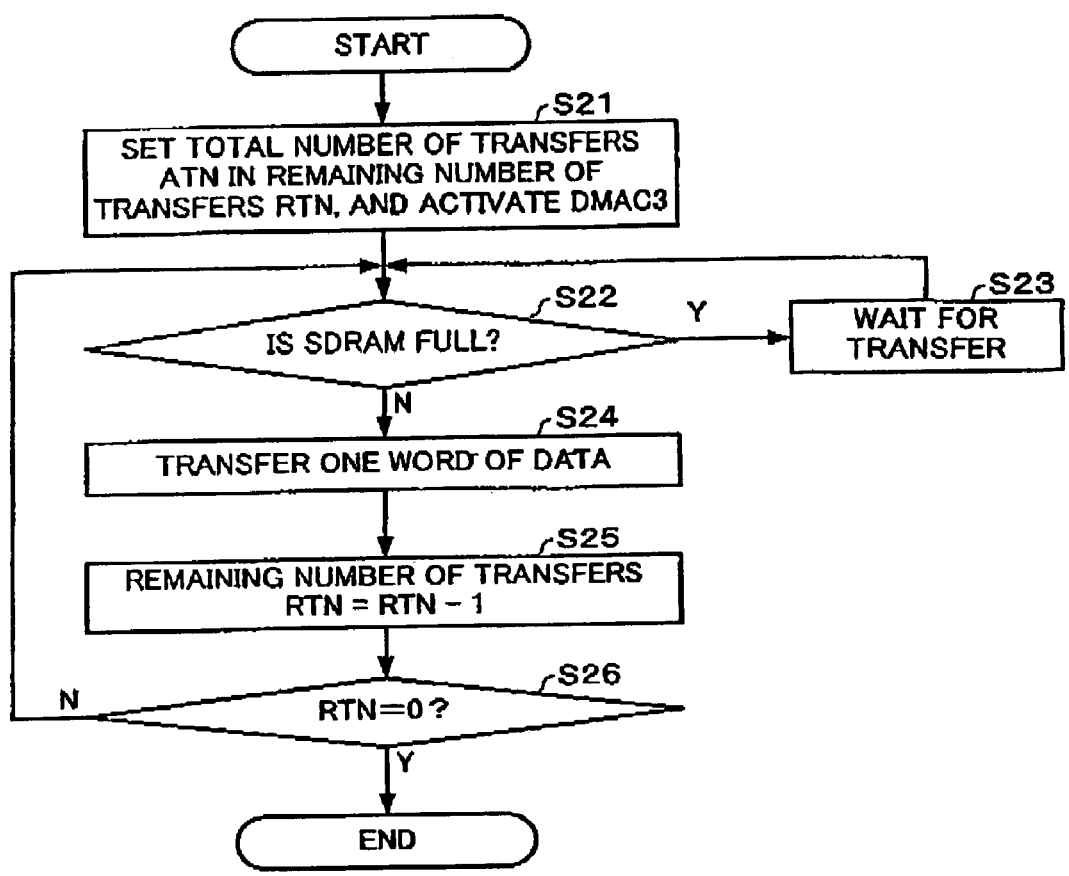
FIG. 16 is another flowchart illustrative of the operation according to one embodiment of the present invention.
Figure 17:
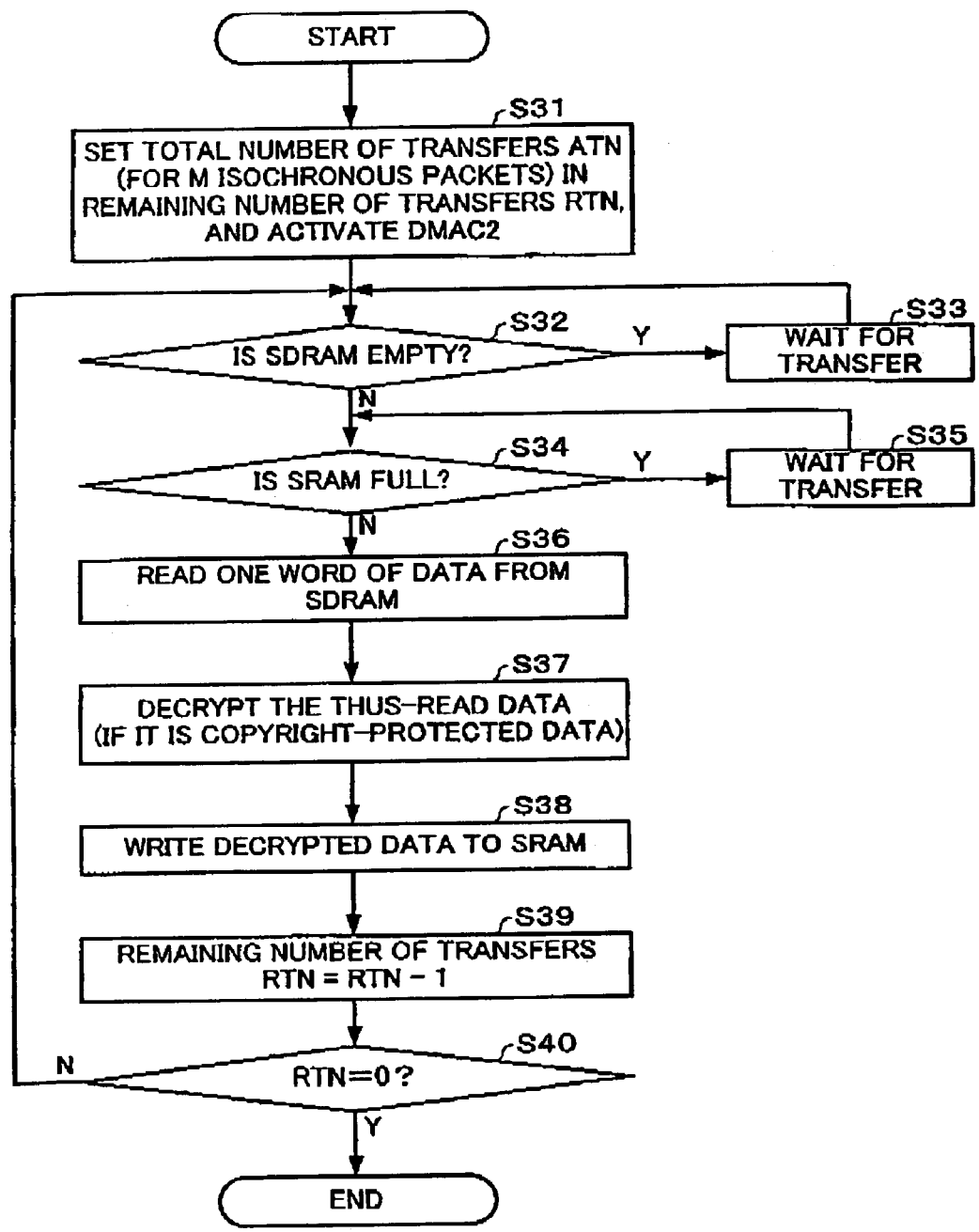
FIG. 17 is a further flowchart illustrative of the operation according to one embodiment of the present invention.

The description now turns to the operation of the data transfer control device of this embodiment, with reference to the flowcharts of FIGS. 15, 16, and 17.

FIG. 15 is a flowchart of the operation during reception.

First of all, the transfer processing starts unconditionally at the reception of an isochronous packet (step S1). The data of the received isochronous packet is written to the isochronous reception data area of the SRAM (step S2).

The system then determines whether or not the quantity of reception data that has been written to SRAM exceeds an automatic DMA transfer unit ATU (step S3). If it does exceed it, the automatic DMA transfer unit ATU is set in the number of remaining transfers RTN and the DMAC2 is activated (step S4). More specifically, the automatic DMA start signal DMAGO of FIG. 11 goes active.

The system then determines whether or not the SDRAM storage area is full (step S5). If it is full, the transfer waits (step S6) until there is space in the SDRAM.

If it is not full (if there is space therein), on the other hand, one word of data is read from the SRAM (step S7). The thus-read data is encrypted and written to the SDRAM (steps S8 and S9).

The number of remaining transfers RTN is decremented by one (step S10). The system then determines whether or not RTN is zero (step S11) and the flow returns to step S5 if RTN is not zero or to step S2 if RTN is zero.

The above described procedure ensures that data that has been received over BUS1 (IEEE 1394) is written to the SDRAM through the SRAM.

FIGS. 16 and 17 are flowcharts of the operation during transmission.

First of all, the total number of transfers ATN is set in the number of remaining transfers RTN and the DMAC3 is activated (step S21).

The system then determines whether or not the SDRAM storage area is full (step 622) and, if it is full, the transfer waits (step S23) until there is space. If it is not full (if there is space therein), one word of data is transferred (step S24).

The number of remaining transfers RTN is then decremented by one (step S25). The system then determines whether or not RTN is zero (step S26) and, if RTN is not zero, the flow returns to step S22 and processing ends when RTN does reach zero.

The above described procedure ensures that data from the BUS2 (IDE) side is written to SDRAM.

The total number of transfers ATN (for M isochronous packets) is then set in the number of remaining transfers RTN and the DMAC2 is activated (step S31), as shown in FIG. 17.

The system then determines whether or not the SDRAM storage area is empty (step S32) and, if it is empty, the transfer waits (step S33) until data has filled the SDRAM. If the SDRAM is not empty (if it is full of data), on the other hand, the system determines whether or not the SRAM storage area is full (step S34). If it is full, the transfer waits (step S35) until there is space in the SRAM.

If the SRAM storage area is not full (if there is space therein), one word of data is read from the SDRAM (step S36). If it is copyright-protected data, the thus-read data is decrypted (step S37), and the decrypted data is written to the SRAM (step S38).

The number of remaining transfers RTN is then decremented by one (step S39). The system then determines whether or not RTN is zero (step S40) and, if RTN is not zero, the flow returns to step S32 and processing ends when RTN does reach zero.

In the above-described manner, data that has been written to SDRAM is written to SRAM.

8. Application to USB

Figure 18:
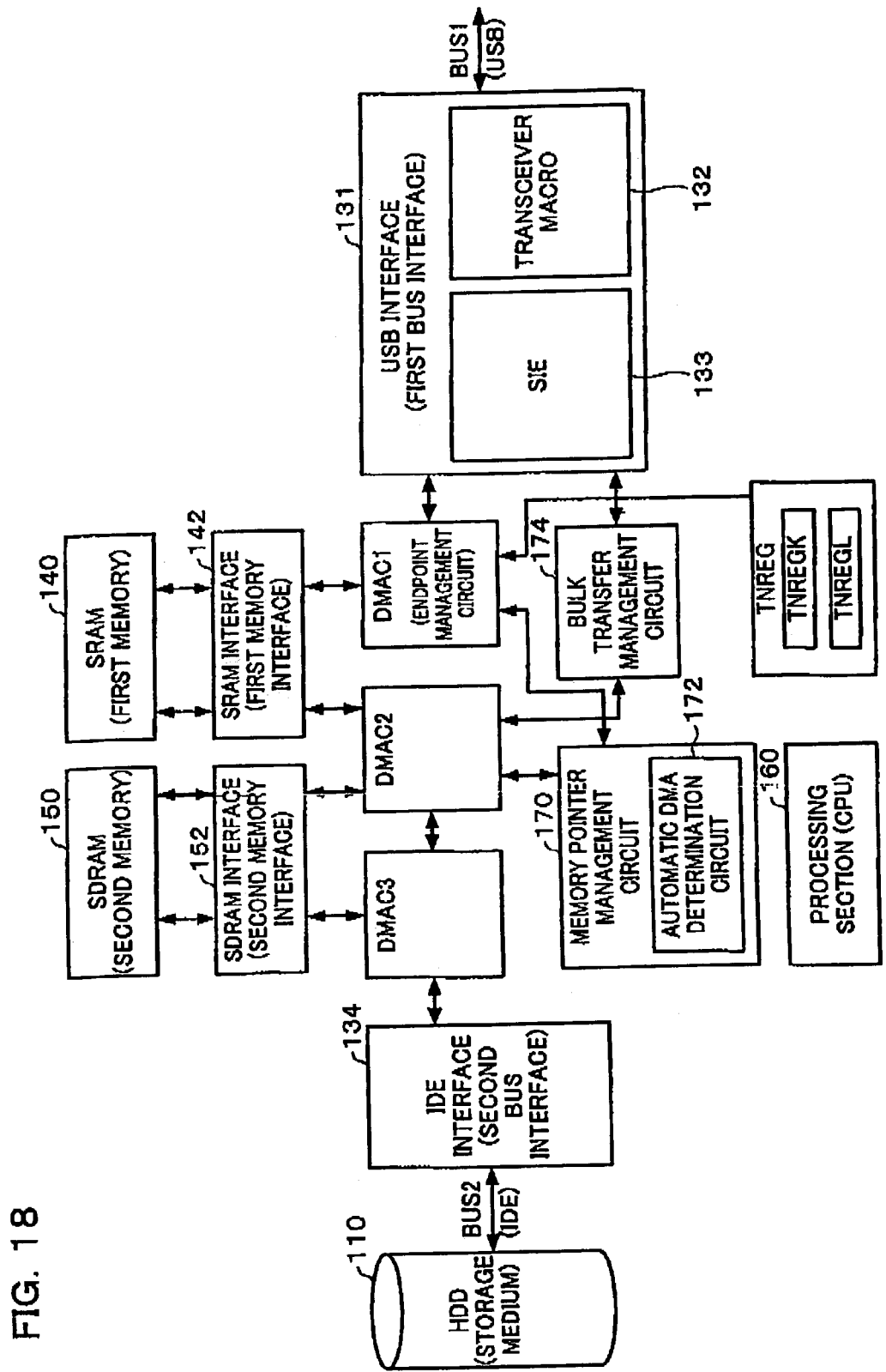
FIG. 18 shows an example of the configuration of the data transfer control device when the method of one embodiment of the invention is applied to USB.

An example of the configuration of the data transfer control device that is shown in FIG. 18 concerns the application of the method of this embodiment to USB (such as USB 2.0).

The configuration of FIG. 18 differs from that of FIG. 3 in the points described below.

That is to say, FIG. 18 is provided with a USB interface 131 instead of the 1394 interface 31 of FIG. 3. In addition, the DMAC1 also has the function of an end point management circuit in FIG. 18. Furthermore, a bulk transfer management circuit 174 is provided in FIG. 18. In all other points, this configuration is substantially the same as that of FIG. 3.

In FIG. 18, a transceiver macro 132 comprised by the USB interface 131 is a circuit for implementing data transfer in USB FS mode or HS mode. A transceiver macro cell that conforms to the USB 2.0 Transceiver Macrocell Interface (UTMI), which defines physical-layer circuitry and some logical-layer circuitry for USB 2.0, could be used as this transceiver macro 132. The transceiver macro 132 comprises an analog front-end circuit for transmitting/receiving data over USB by using a difference signal, and it could also comprise circuitry for processing such as bit stuffing, bit unstuffing, serial-to-parallel conversion, parallel-to-serial conversion, NRZI decoding, NRZI encoding, and sampling clock generation.

A serial interface engine (SIE) comprised by the USB interface 131 is circuitry for performing various processes such as USR packet transfer processing. This SIE could comprise circuitry for managing transactions, circuitry for assembling (creating) and disassembling packets, and circuitry for creating or reading CRCs.

Circuits such as the DMAC1, DMAC2, and DMAC3 of FIG. 18 implement processing that is similar to that of the circuits described with reference to FIG. 3, etc.

Note that the DMAC1 also has the function of managing the end points that form entrances to the storage areas of an SDRAM 140. Specifically, the DMAC1 comprises a register for storing end point attribute information.

The bulk transfer management circuit 174 is a circuit for managing bulk transfers by USB.

9. Transfer Number Reservation Register

To make the processing for transferring isochronous packets more efficient in this embodiment, data transfer is done by the method described below.

Figure 19A:
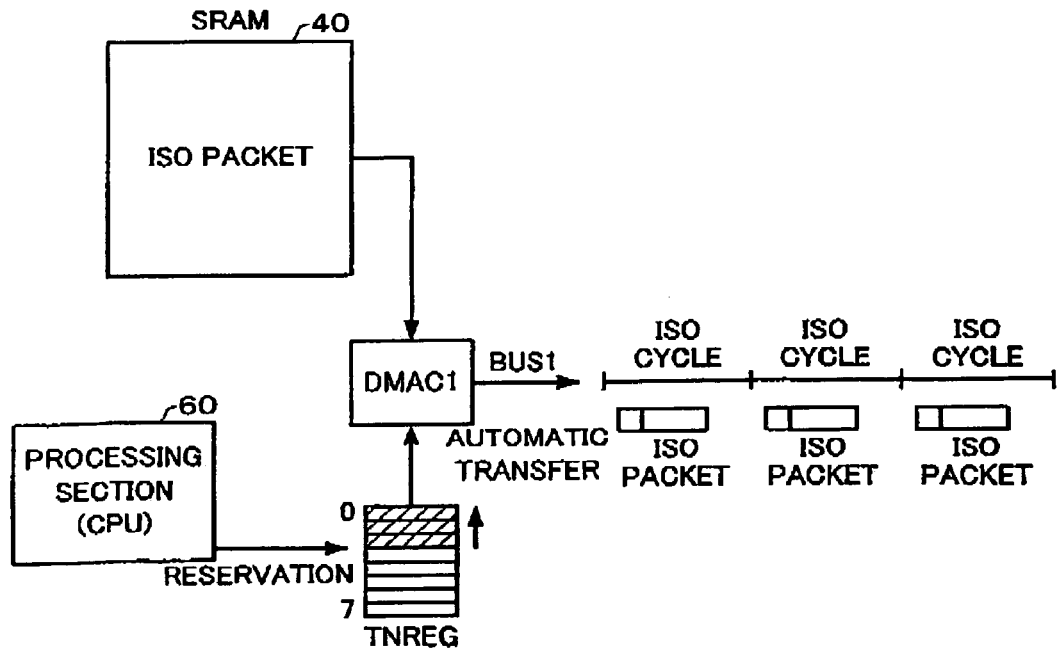
FIGS. 19A and 19B are illustrative of a data transfer method using a transfer number reservation register.
Figure 19B:
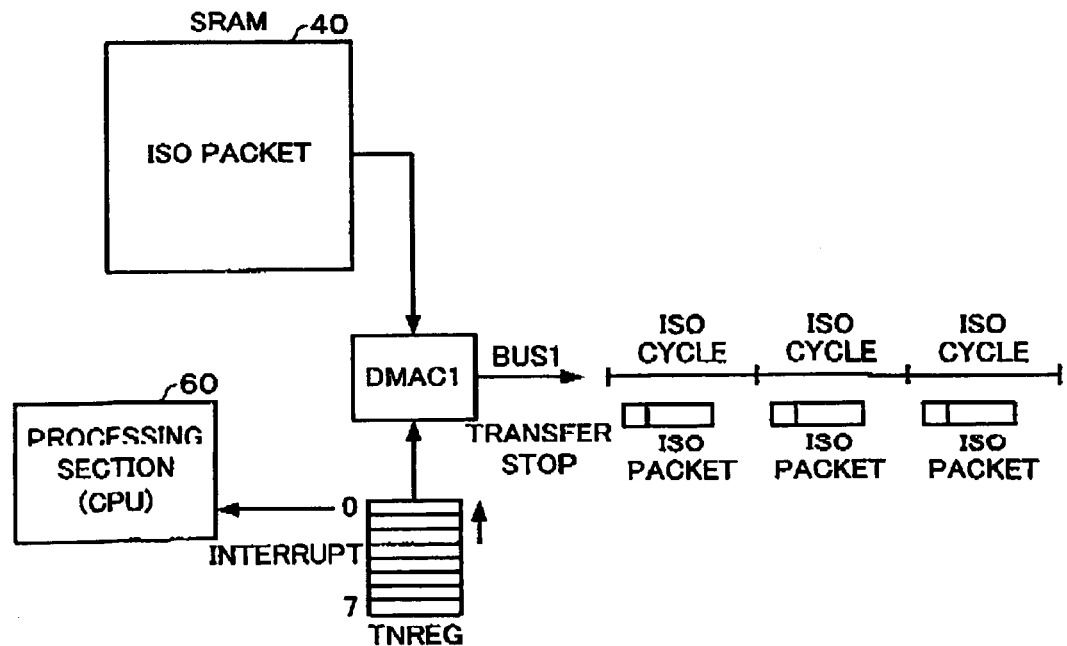

In other words, with this embodiment as shown in FIGS. 3, 19A, and 19B, a transfer number reservation register TNREG is provided, for reserving the number of transfers required for an isochronous packet. Assume by way of example that it is possible to reserve the transfer of eight (generally speaking: N) isochronous packets in FIGS. 19A and 19B.

If the processing section 60 reserves that number of transfers in TNREG, as shown in FIG. 19A, the start of transfer (transmission) of isochronous packets for the reserved number of transfers is instructed. In other words, the DMAC1 reads each isochronous packet (ISO header and ISO data) from the SRAM 40. The DMAC1 then performs automatic transfer of the thus-read isochronous packets (without involving the processing section 60) until the number of transfers reserved in TNREG reaches zero. That is to say, an isochronous packet is transferred automatically at each isochronous transfer cycle (such as every 125 μs) to the BUS1 side.

When the number of transfers that has been reserved in the transfer number reservation register of this embodiment reaches zero, the automatic transfer is halted at the next isochronous transfer cycle, as shown in FIG. 19B. An interrupt is outputted to the processing section 60. This makes it possible to inform the processing section 60 that the reserved number of transfers of isochronous packets has ended, in a simple manner. The processing section 60 (firmware) can therefore use the time after it has reserved the number of transfers into TNREG and until the interrupt is returned, for other processes.

A method different from that of FIGS. 19A and 19B that can be considered involves the processing section 60 instructing the start of transfer of each isochronous packet, at each isochronous transfer cycle.

This method, however, necessitates the same number of transfer start instructions as isochronous packets. In other words, if the isochronous transfer cycle is 125 μs, a transfer start instruction must be generated every 125 μs. This increases the processing load on the processing section 60.

In contrast thereto, the method in accordance with this embodiment shown in FIGS. 19A and 19B ensures that once the processing section 60 has reserved a number of transfers, it need not instruct transfer start until the transfer of isochronous packets for that number of transfers has ended. As a result, the processing load on the processing section 60 can be reduced, thus improving the effective transfer rate.

With this embodiment, the processing section 60 can use spare time for other processes, thus enabling an increase in usage efficiency of the processing section 60. Since this also means that there is no need to use a high-performance processing section 60 (CPU), even for time-shift reproduction in which image data is read from the HDD while other image data is being recorded thereon, it enables a reduction in cost of the device.

In isochronous transfer, the demands of time stamp control place a limit on the number of transfers of isochronous packets that can be reserved at each time point. For that reason, the processing section 60 (firmware) calculates how many isochronous packets can be transferred from that point, with reference to the isochronous packet time stamps, then determines the number of transfers that can be reserved at that point, based on the calculation result. This embodiment makes it possible to reserve the number of transfers that is determined by the processing section 60 in this manner in the transfer number reservation register TNREG, making it possible to implement efficient data transfer while observing the limits caused by time stamp control.

Figure 20:
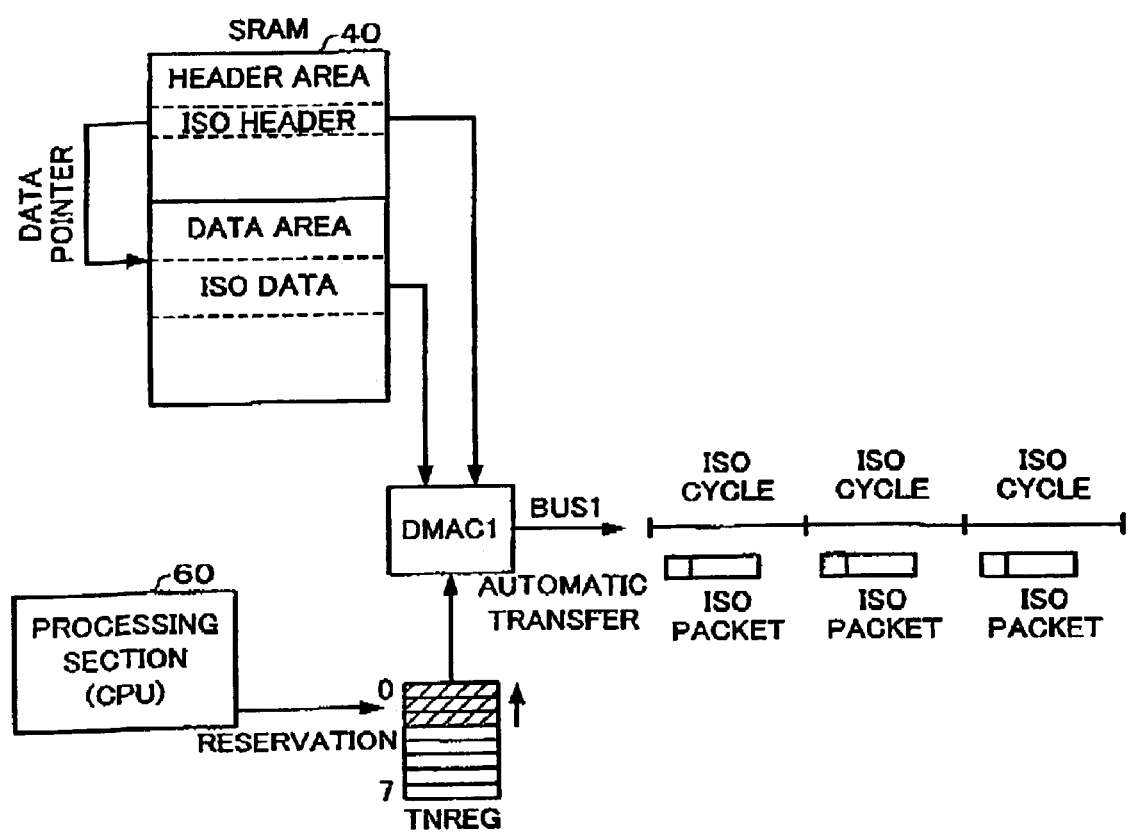
FIG. 20 is illustrative of a method in which data pointers are used.

Note that it is preferable that a data pointer for isochronous data to be assembled with the isochronous header (a pointer indicating that address in the data area) is written to the header area (isochronous header) of the SRAM 40, as shown in FIG. 20. It is also preferable that the DMAC1 uses that data pointer to assemble the isochronous packet composed of an isochronous (ISO) header and isochronous (ISO) data, for automatic transfer to the BUS1 side.

By having the processing section 60 write the isochronous header (see FIG. 2B) to a prepared header area and reserve a number of transfers in TNREG, this embodiment makes it possible to automatically assemble isochronous packets to match the reserved number of transfers, for automatic transfer to the BUS1 side. This makes it possible to further reduce the processing load on the processing section 60.

If a data pointer is used as shown in FIG. 20, it becomes simple to select isochronous data (such as a TS packet comprising an I picture) to be transferred to the BUS1 side and isochronous (such as a TS packet that does not comprise an I picture) that is not to be transferred.

Note that the transfer number reservation register TNREG could be implemented by retention circuits such as flip-flops, or by memory such as RAM.

The end of the transfer of data corresponding to the reserved number of transfers could be posted to the processing section 60 by a method other than an interrupt. In addition, a circuit for masking the interrupt to the processing section 60 could also be provided.

In the present invention for the transfer of isochronous packets by using a transfer number reservation register, a configuration is possible such that the SDRAM 50 of FIG. 3 is not provided.

It is also preferable that the transfer number reservation register TNREG is a register that is capable to reserving any desired number of transfers. This configuration would make it possible to set the optimal number of transfers in TNREG, to suit the size of data in the isochronous packets or the isochronous transmission data area of the SRAM 40.

With digital video (DV) data, for example, the data for TS packets is large. When transferring such DV data, therefore, if a large value is set for the reserved number of transfers, a situation may arise in which it is not possible to write isochronous data for that large number of transfers in the isochronous transmission data area of the SRAM 40. If TNREG is a register that is capable of reserving any number of transfers, this situation can be prevented by setting a suitable number of transfers in TNREG.

10. Transfer Number Reservation for Each Page

Figure 21:
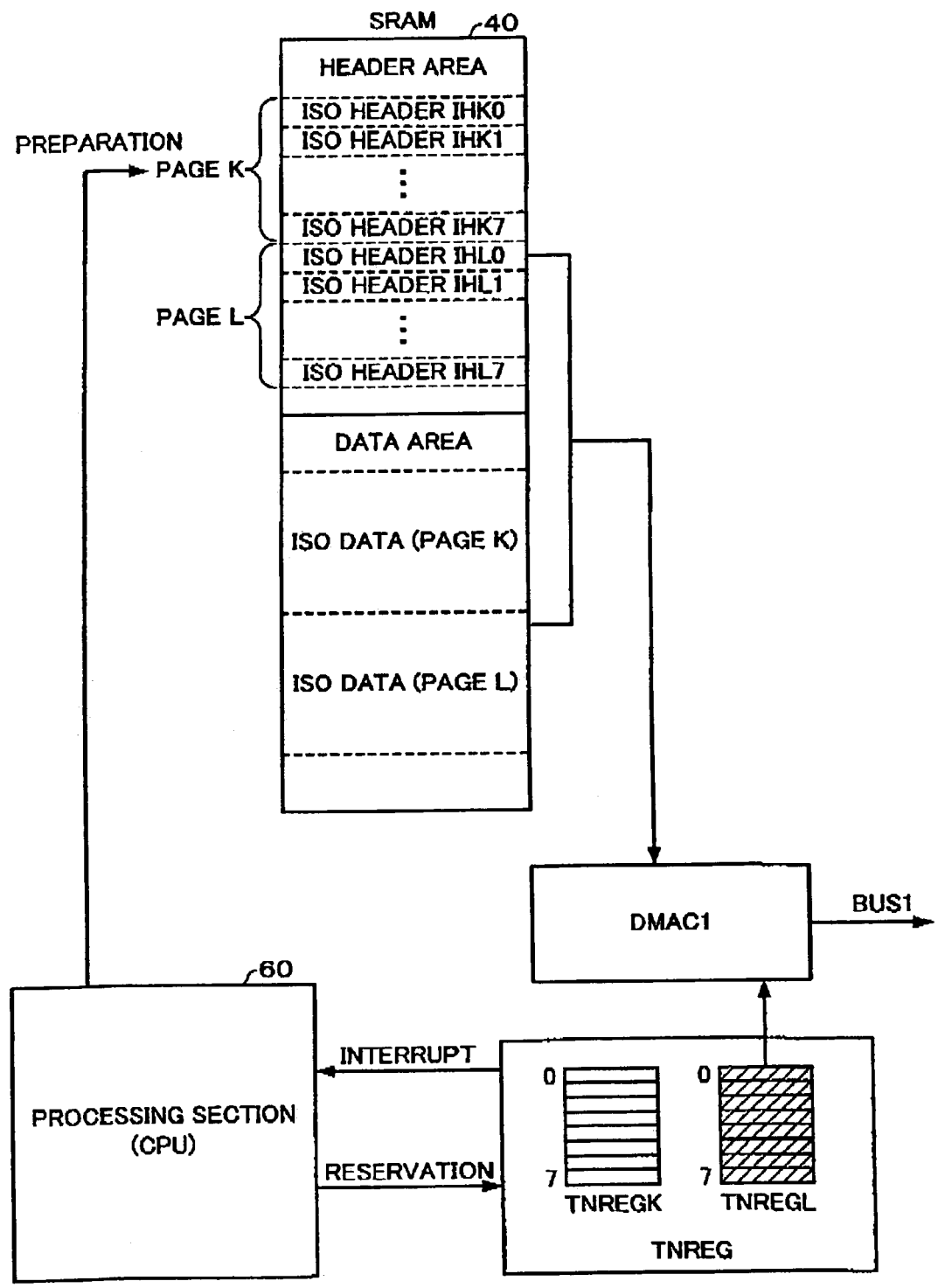
FIG. 21 is illustrative of a data transfer method using transfer number reservation registers for pages K and L.

With this embodiment, the storage area of the SRAM 40 (the first memory) is divided into a header area (isochronous header area) and a data area (isochronous data area), as shown in FIG. 21. The header area is divided into an area for page K (the Kth page area) and an area for page L (the Lth page area).

The transfer number reservation register TNREG comprises TNREGK and TNREGL, which are registers for reserving the numbers of transfers for page K (usually page 0) and page L (usually page 1).

When the processing section 60 is preparing isochronous headers IHK0 to IHK7 in the page K area, the DMAC1 (first memory access control circuit) reads the isochronous headers that are written to the page L area and isochronous data that is written to the data area, as shown in FIG. 21. In other words, it reads the page L isochronous headers IHL0 to IHL7 in sequence and reads the isochronous data (TS packets) indicated by the data pointers of the thus-read isochronous headers (see FIG. 20).

The DMAC1 automatically transfers isochronous packets configured of the thus-read isochronous headers and isochronous data at each isochronous transfer cycle to the BUS1 side until the number of transfers reserved in TNREGL reaches zero, as described with reference to FIGS. 19A and 19B.

Similarly, when the processing section 60 is preparing isochronous headers IHL0 to IHL7 in the page L area, the DMAC1 reads the isochronous headers that are written to the page K area and isochronous data that is written to the data area. In other words, it reads the page K isochronous headers IHK0 to IHK7 in sequence and reads the isochronous data indicated by the data pointers of the thus-read isochronous headers.

The DMAC1 automatically transfers isochronous packets configured of the thus-read isochronous headers and isochronous data at each isochronous transfer cycle to the BUS1 side until the number of transfers reserved in TNREGK reaches zero.

Figure 22:
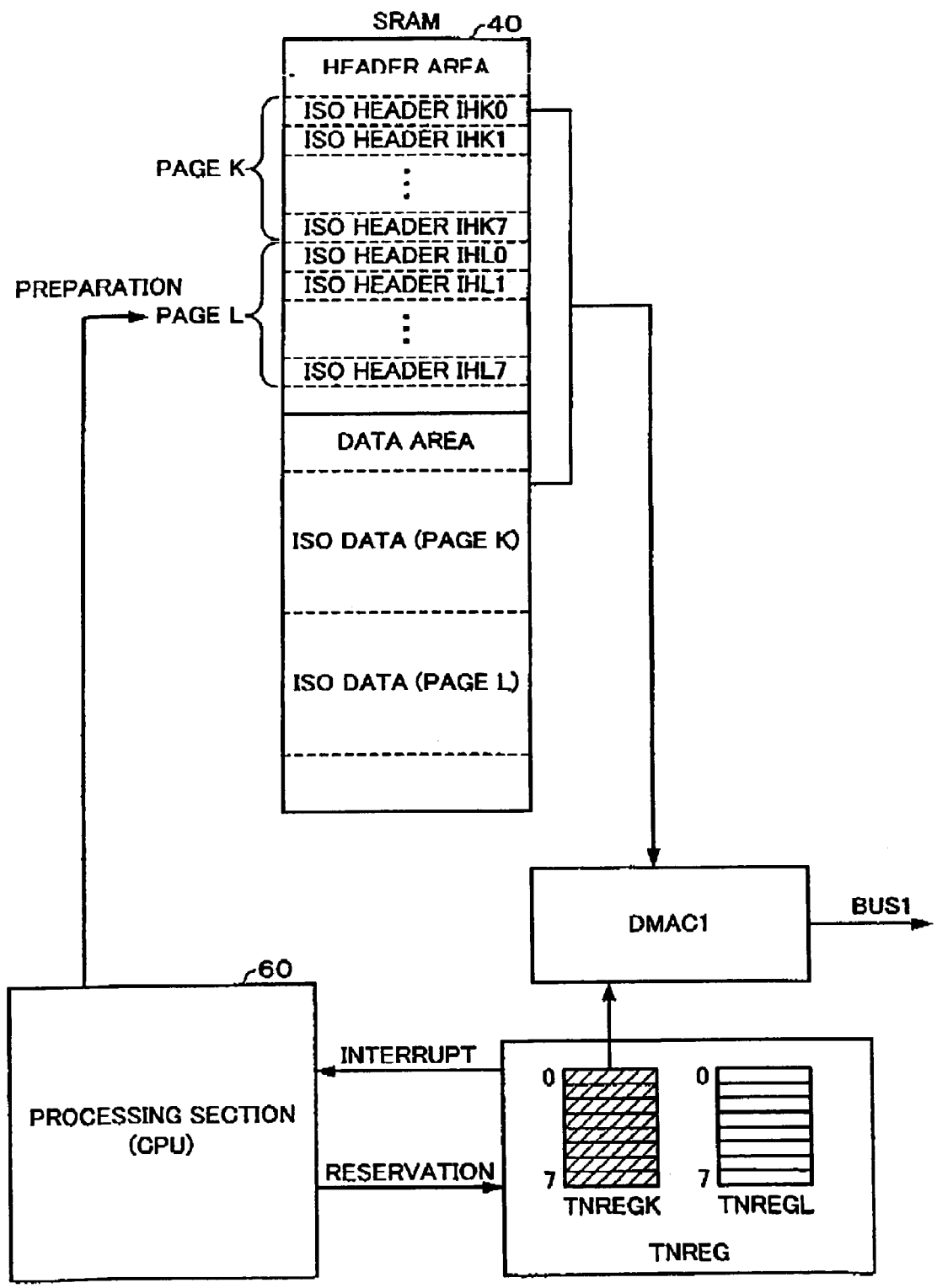
FIG. 22 is further illustrative of a data transfer method using transfer number reservation registers for pages K and L.

Use of the method shown in FIGS. 21 and 22 makes it possible to reserve the transfer of 16 isochronous packets ahead, by setting 8 in each of TNREGK and TNREGL, by way of example.

In addition, use of the method of FIGS. 21 and 22 ensures that the processing section 60 need not be aware of how far the transfer of isochronous packets has progressed, during the work of writing isochronous headers to the header area. For example, transfer processing for the page L area could be performed while isochronous headers are being written to the page K area as shown in FIG. 21, and transfer processing for the page K area is not performed. The processing section 60 need only perform the simple tasks of preparing the desired isochronous header and writing that isochronous header to the page area that is not being transferred. This makes it possible to simplify the processing of the processing section 60 and reduce the processing load thereof, thus improving the effective transfer rate.

An example of the register map of the transfer number reservation register TNREG is shown in FIG. 23.

First of all, the processing section 60 writes isochronous headers to the header area then sets numbers of transfers (numbers of headers) in the page K count (page 0 count) and page L count (page 1 count).

If the page K count and page L count are not zero, the data transfer control device (hardware circuit) starts isochronous transfer in each isochronous transfer cycle. In this case, the selection of which of the page K and page L to start transferring is set by using a separately provided transfer mode select register. After a system reset, the value in the transfer mode select register is set to the value that selects the page K transfer mode. The processing section 60 therefore starts the transfer from page K, by simply setting the value in the page K count.

The page K count is decremented by one each time the transfer of one isochronous packet (isochronous header) ends. When the page K count becomes zero, an interrupt is outputted to the processing section 60.

During the page K transfer, the processing section 60 (firmware) prepares the page L isochronous headers. It then sets a value in the page L count.

When the page K transfer ends, the value in the transfer mode select register is switched from the page K transfer mode to the page L transfer mode. If a value (number of transfers) is set in the page L count, transfer of the page L isochronous packets starts.

Note that if zero is set in the page K count and page L count, the transfer is completely halted.

Figure 24:
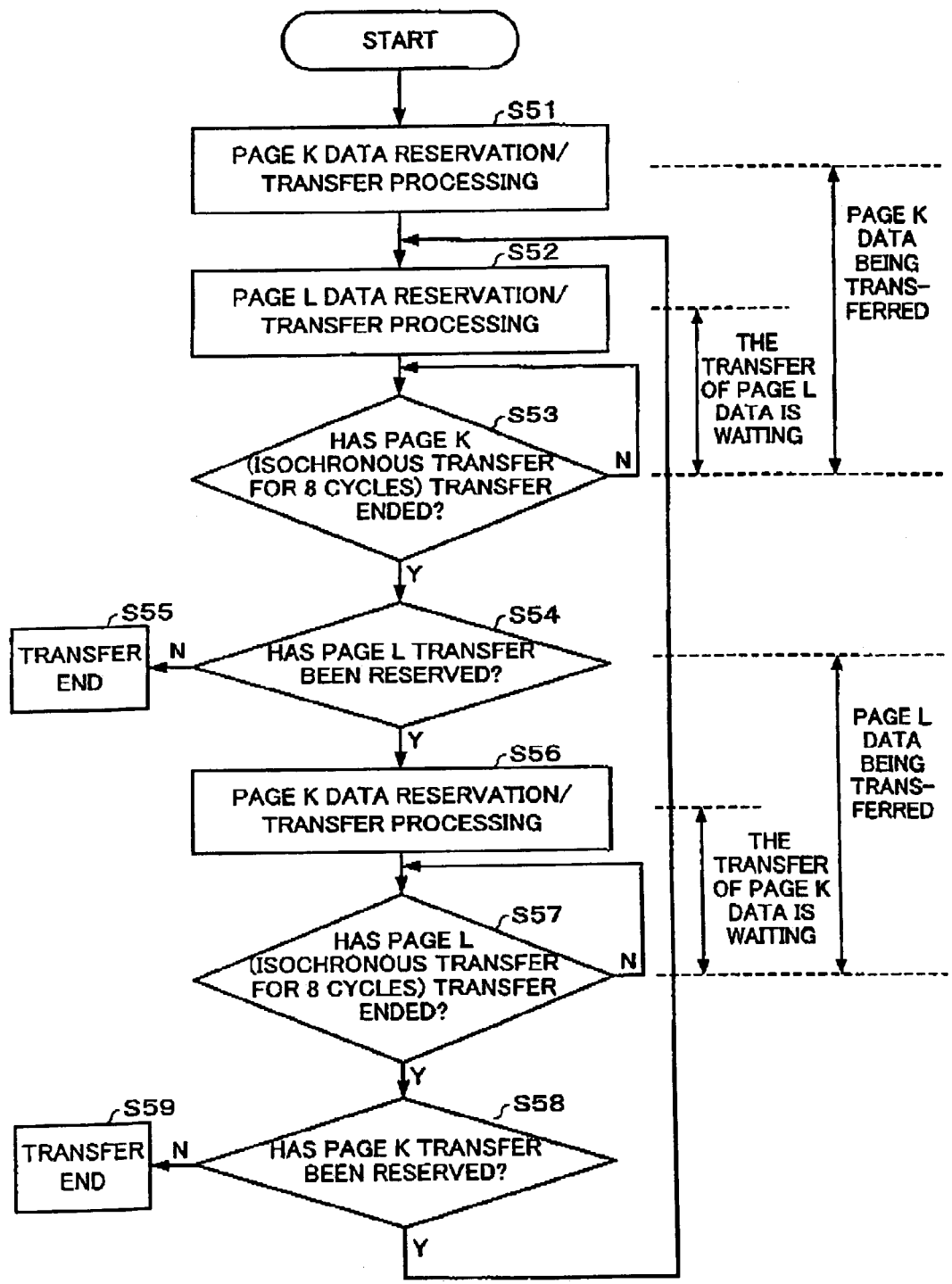
FIG. 24 is a flowchart illustrating transfer processing using the transfer number reservation register.
Figure 25:
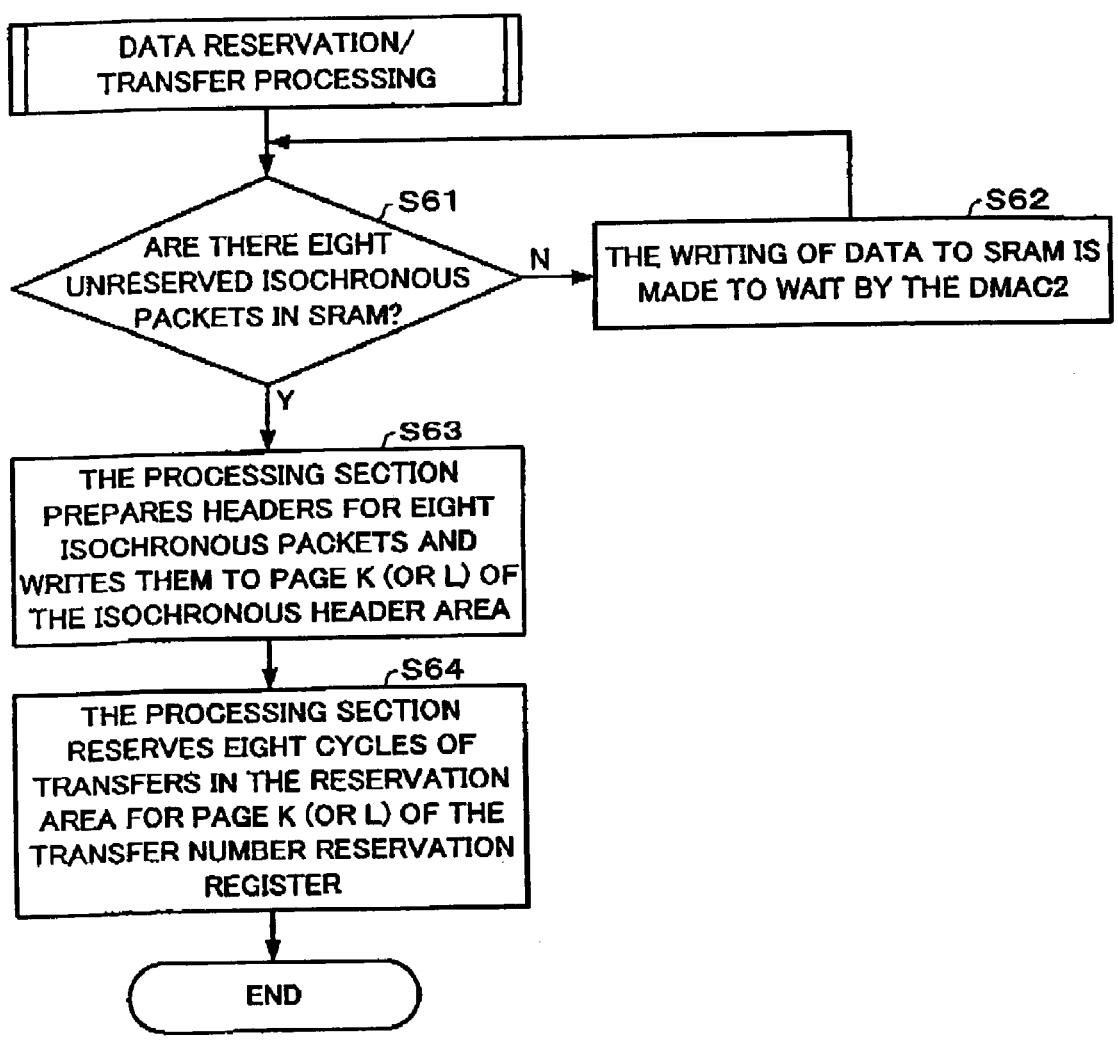
FIG. 25 is a flowchart illustrating data reservation/transfer processing.

The description now turns to details of the transfer processing using the transfer number reservation register TNREG, with reference to the flowcharts of FIGS. 24 and 25.

First of all, data reservation/transfer processing for page K is performed (step S51). This starts data transfer for page K. Next, data reservation/transfer processing for page L is performed (step S52). When that happens, since the data transfer for page K has already started, the data transfer for page L is made to wait.

The system then determines whether or not the transfer of page K (isochronous transfer for eight cycles) had ended (step S53). If it has ended, it determines whether page L transfer has been reserved (step S54). If it has not been reserved, the transfer ends. If it has been reserved, on the other hand, page L data transfer starts.

The page K data reservation/transfer processing is then done (step S56). When that happens, the page K data transfer is made to wait because the page L data transfer has already started.

The system then determines whether or not the page L transfer (isochronous transfer of 8 cycles of data) has ended (step S57). If it has ended, it determines whether a page K transfer has been reserved (step S58). If it has not been reserved, the transfer ends (step S59). If it has been reserved, on the other hand, the flow returns to step S52.

FIG. 25 is a flowchart illustrating the data reservation/transfer processing of steps S51, S52, and S56 of FIG. 24.

First of all, the system determines whether or not there are eight unreserved isochronous packets in SRAM (step S61). If there are not eight packets there, the writing of data to the SRAM is made to wait by the DMAC2 (step S62).

If there are eight packets there, on the other hand, the processing section prepares headers for eight isochronous packets and writes them to page K (or L) of the isochronous header area (step S63). The processing section then reserves eight cycles of transfers in the reservation area (TNREGK) for page K (or L) of the transfer number reservation register (step S64).

The above-described method makes it possible to implement efficient data transfer using pages K and L.

Note that the number of pages of this embodiment has been described as two, but the number of pages could be three or more.

11. Special Reproduction of MPEG Stream

It is possible to use the method of this embodiment as shown in FIGS. 19A to 25 to implement efficient data transfer, even during special reproduction (such as fast-forwarding) of an MPEG stream.

Figure 26:
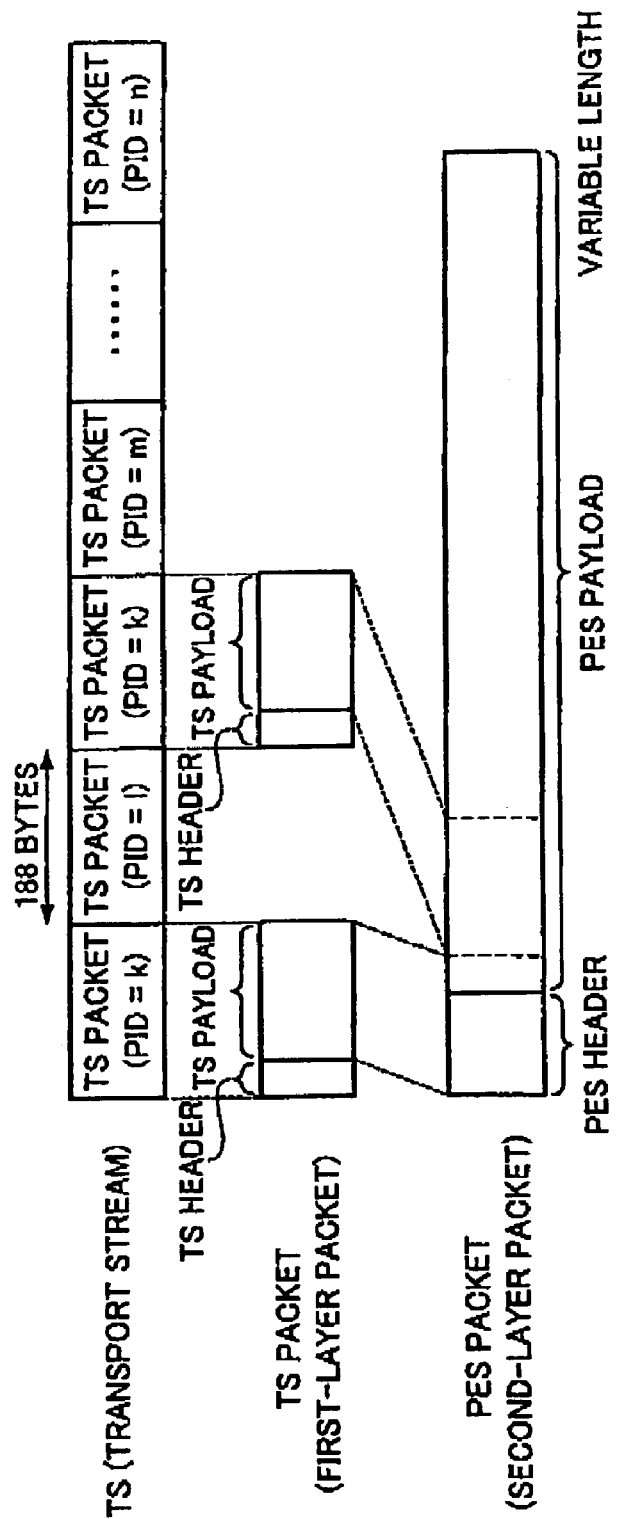
FIG. 26 is illustrative of the configuration of an MPEG stream.

The stream configuration (hierarchical structure) of an MPEG2 (hereinafter called simply MPEG) stream is shown in FIG. 26.

An MPEG transport stream (TS) packet is a method of multiplexing different kings of data, such as an I picture (generally speaking; intra-frame encoding data). B picture and P picture (generally speaking; inter-frame encoding data or predicted encoding data), and audio data (sound data or non-video data) in one bit stream.

As shown in FIG. 26, the MPEG stream forms a packetized elementary stream (PES) packet by linkages between TS packet payloads (payload portions, or data portions). More specifically, a variable-length PES packet formed of a PES header and PES payload is put together by assembling TS packet payloads having the same packet identification information (PID).

In this case, an elementary stream (ES) forms a structural component for contents such as video or audio. This ES with a header attached is called a PES. With MPEG2, PES multiplexing is defined by two types of multiplexed stream: transport stream (TS) and PS (Program Stream). A transport stream (TS) is a linked stream of 188-byte fixed-length TS packets. Each of these TS packets consists of a TS header (header portion) and a TS payload (payload portion).

With an electronic instrument such as a digital recording/reproduction device, an important technical concerns relates to how to implement special reproduction (trick play) functions such as fast-forwarding.

Figure 27:
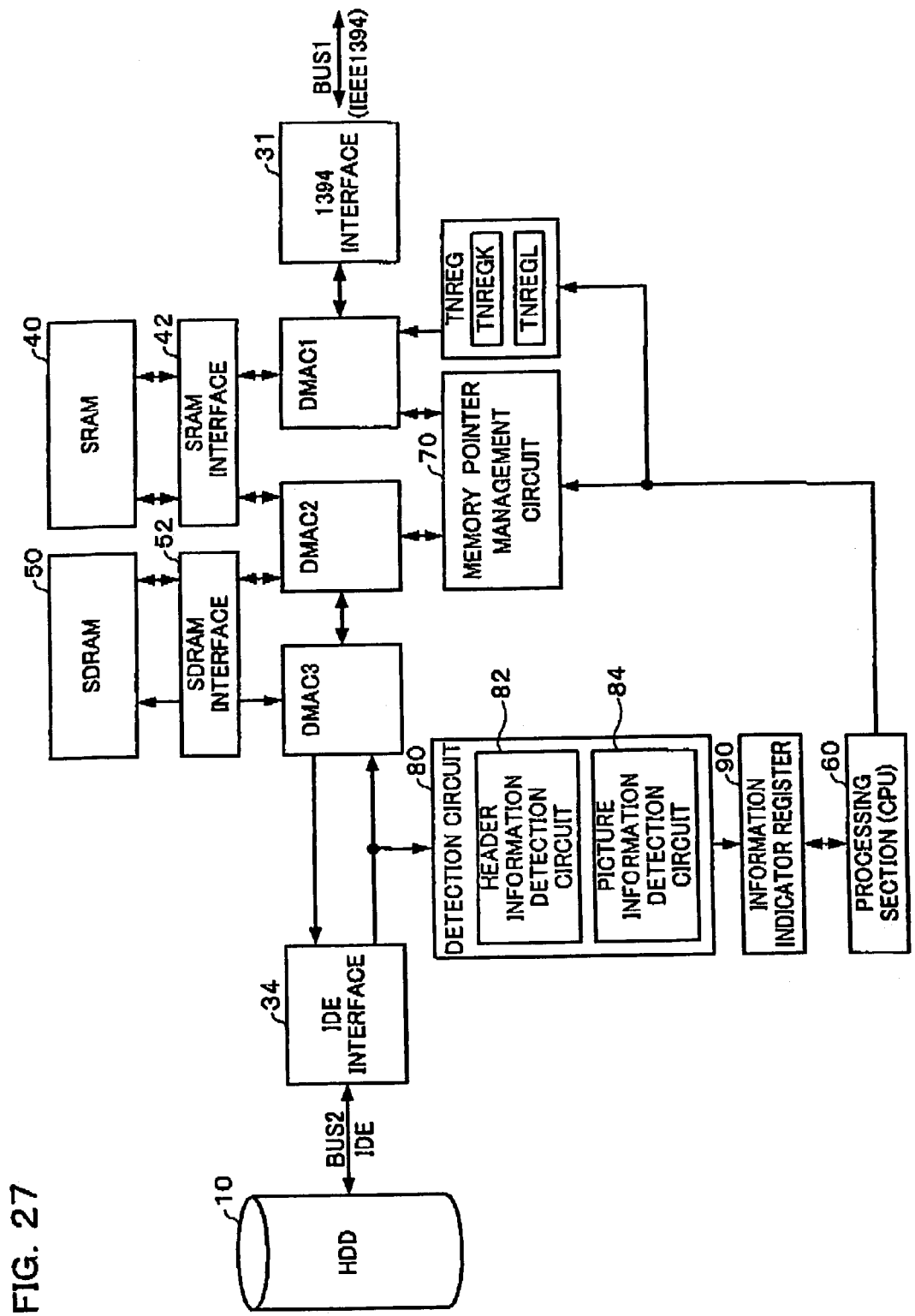
FIG. 27 shows an example of the configuration of a data transfer control device that detects header information and picture information, and selects a TS packet including an I picture.

In order to solve that technical problem, this embodiment is provided with a detection circuit 80 that comprises a circuit 82 which detects header information (such as stream ID) of a PES packet (a packet configured by linking together TS packets, as shown in FIG. 26) and a circuit 84 which detects picture information (such as a start code) of the payload of the PES packet, as shown in FIG. 27. The information indicator register 90 is provided for displaying the thus-detected header information and picture information in the processing section 60.

Figure 28A:
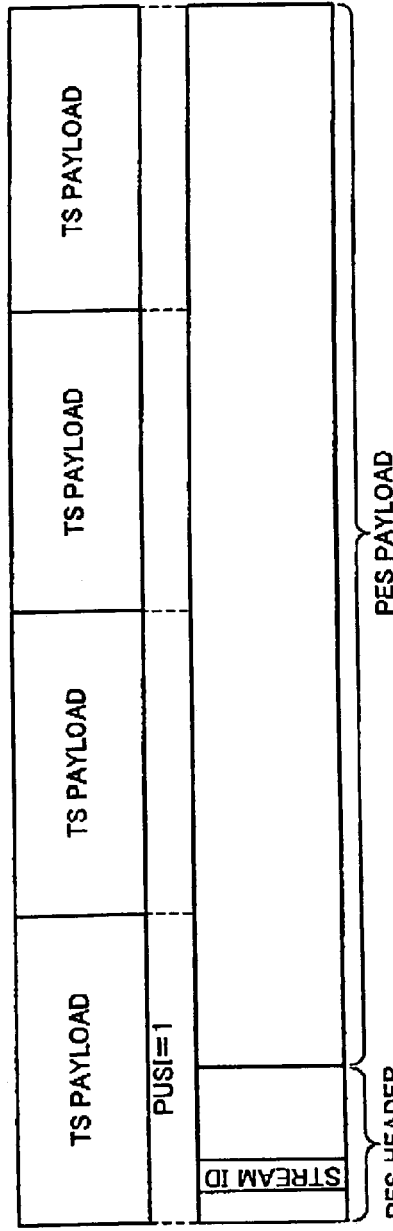
FIGS. 28A and 28B are illustrative of the detection processing of the header information detection circuit and picture information detection circuit.

More specifically, the header information detection circuit 82 first detects whether or not the packet identification number (PID) of a TS packet is a PID specified by the processing section 60. If this is a specified PID, the system then determines whether or not the payload of that TS packet is the TS payload at the head of a PES packet, using a payload portion start indicator (PUSI) comprised with in the TS header. It then acquires the stream ID of the PES header, as shown in FIG. 28A, and confirms whether this is a video stream TS packet or an audio stream (non-video stream) TS packet. It writes the thus-acquired stream ID and the storage address of the stream ID for the SRAM 40 in an information indicator register 90, and informs the processing section 60.

Figure 28B:
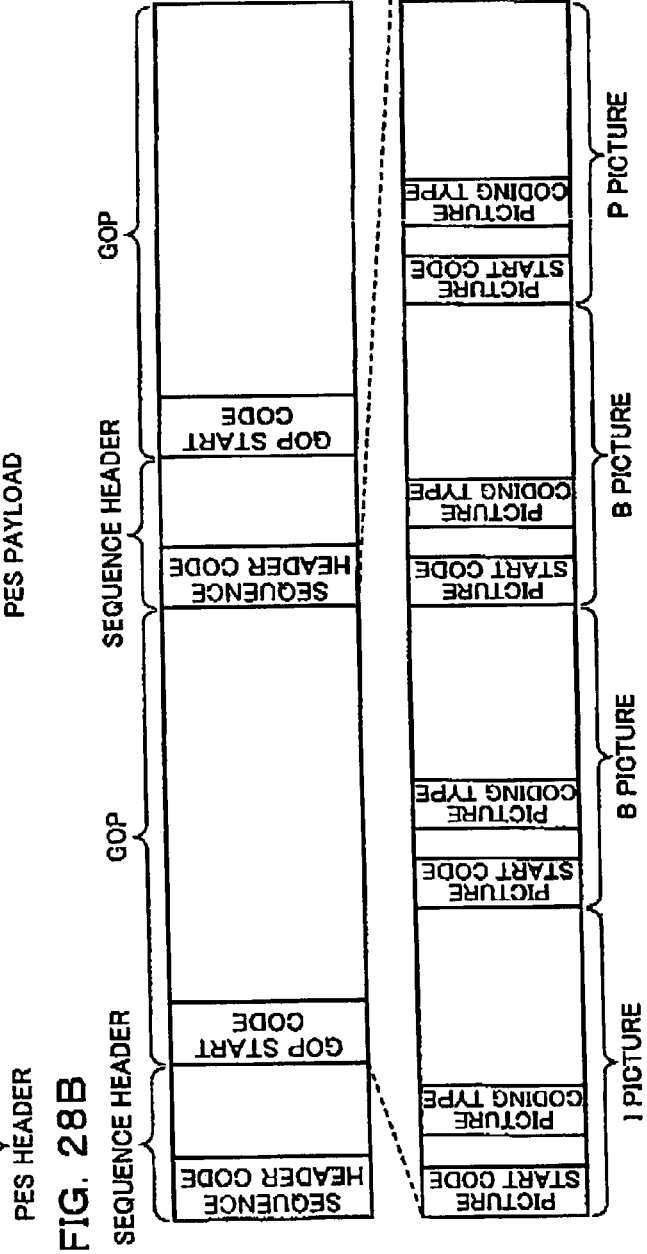

If it is determined that the PID of the TS packet is a PID specified by the processing section 60 and also that this is a video stream TS packet, the picture information detection circuit 84 detects the data bytes (payload) of the PES packet. It acquires the start code comprised within those data bytes. If the thus-acquired start code is a sequence header code, group start code, or picture start code, as shown in FIG. 28B, that start code and the storage address of the start code in the SRAM 40 is written to the information indicator register 90 and the processing section 60 is informed.

The processing section 60 (firmware) determines that the TS packet is to be transferred through the BUS1 (IEEE 1394), based on the detection information (header information and picture information) from the information indicator register 90. The DMAC1 uses the data pointer within the isochronous header (see FIG. 20) to select the TS packet to be transferred through the BUS1. During fast-forwarding (during special reproduction), by way of example, a TS packet comprising an I picture (generally speaking: a intraframe encoding data) is selected and an isochronous header from the header area is attached to the thus-selected TS packet. The thus-obtained isochronous packet is transferred to the digital tuner 20 (generally speaking: an electronic instrument connected to the BUS1) of FIG. 1 through the 1394 interface 31 and the BUS1.

With the P picture and B picture (inter-frame encoding data, predicted encoding data) within the MPEG stream, for example, an image cannot be reproduced with only that one frame of data. With the I picture (intra-frame encoding data), on the other hand, an image can be reproduced with that one frame of data.

With this embodiment, a TS packet (second-layer packet) comprising an I picture is selected and transferred to the BUS1 side.

Figure 29:
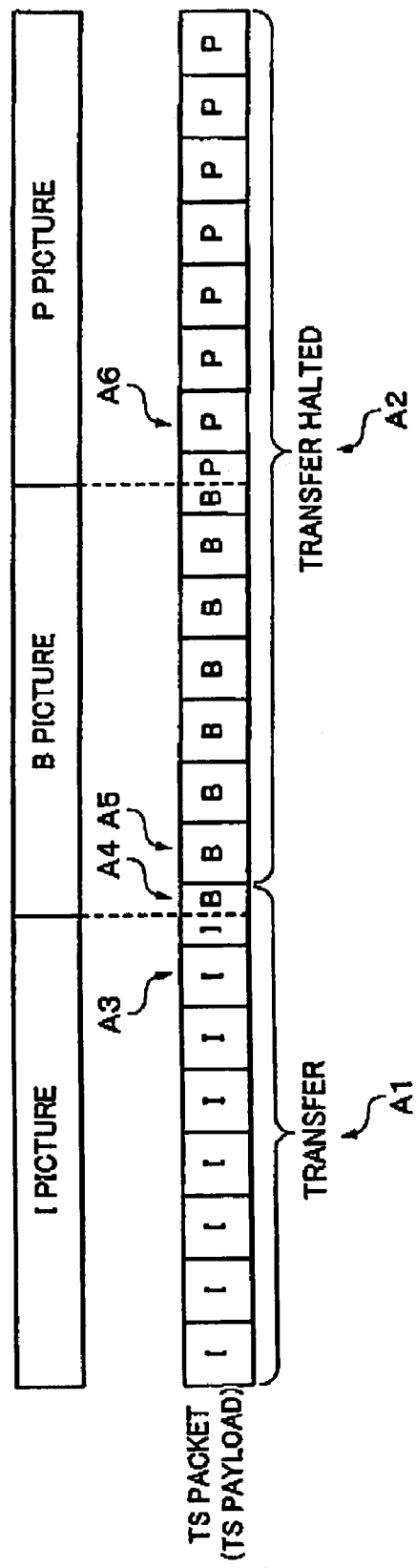
FIG. 29 is illustrative of a method of halting the transfer of TS packets that do not have I pictures, during special reproduction.

More specifically, during special reproduction such as fast-forwarding, a TS packet comprising an I picture is transferred to the digital tuner 20 through the BUS1, as shown at A1 in FIG. 29.

On the other hand, the transfer (transmission) through the BUS1 of a TS packet comprising audio data (non-video data TS packet) or a TS packet comprising a B picture and P picture, with no I picture (a TS packet monopolized by the B picture and P picture), is halted, as shown at A1 in FIG. 29.

Since the TS packet (TS payload) at A3 in FIG. 29 comprises an I picture, transfer is permitted. Similarly, transfer of a TS packet comprising a B picture but also an I picture is permitted, as shown at A4. Transfer of the TS packets shown at A5 and A6 is halted because they are monopolized by a B picture or P picture alone.

With this embodiment as configured above, it is possible to prevent distortion of the image during special reproduction, since video data other than I picture data is not transferred to the digital tuner 20. Since audio data is also not transferred, it is possible to prevent the generation of noise. Since it is therefore possible to transfer masses of I picture data by an IEEE 1394 bus that limits the amount of data transferred, it is possible to reproduce smooth moving images without any dropout of frames.

In addition, since the detection of header information and picture information is done by the detection circuit 80 that is configured of hardware, the processing load on the processing section 60 (firmware) can be reduced so that the processing section 60 can use any spare time for other processing.

12. Selection by Data Pointer

The description now turns to the method of using a data pointer to select TS packets (generally speaking: second-layer packets of a lower layer than isochronous packets).

Figure 30:
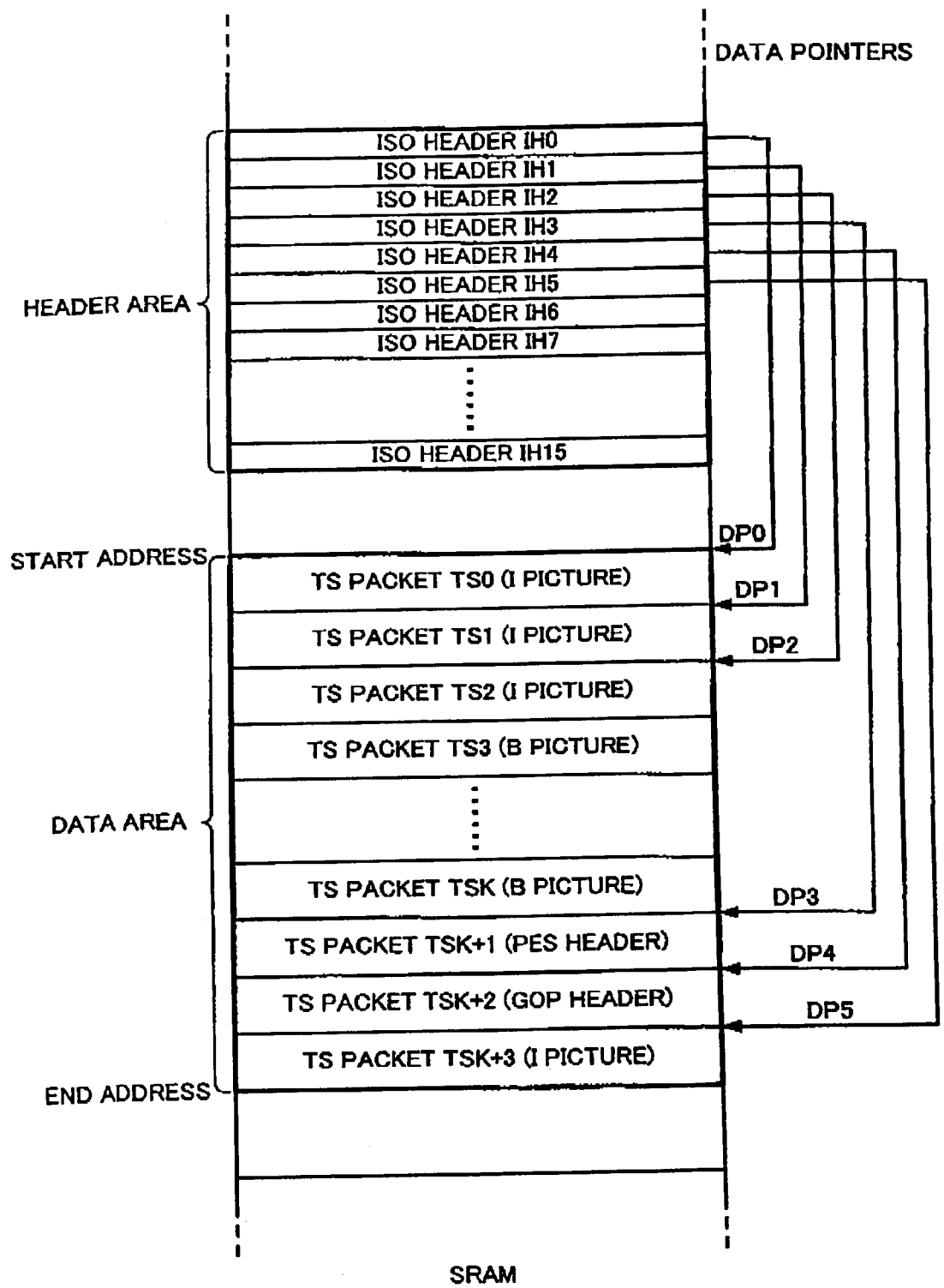
FIG. 30 is illustrative of a method of using a data pointer to select a TS packet.

With this embodiment, each isochronous (ISO) header is written to the header area (transmission header area) of the SRAM 40 and each TS packet is written to the data area (transmission data area or transmission stream area) thereof, as shown in FIG. 30. Data pointers DP0 to DP5 (pointers indicating addresses of TS packets in the data area) are written to the header area. These data pointers DP0 to DP5 are attached to trailers of isochronous headers IH0 to IH5, by way of example. These data pointers DP0 to DP5 are used to select packets TS0, TS1, TS2, TSK+1, TSK+2, and TSK+3 that are to be linked to the isochronous headers IH0 to IH5.

More specifically, the processing section 60 of FIG. 27 determines which TS packets to transfer through the BUS1, based on the header information and picture information from the information indicator register 90. It also prepares isochronous headers comprising data pointers indicating the addresses (head addresses) of TS packets to be transferred. With this embodiment, the storage addresses of stream IDs and start codes (addresses in the transmission stream area)

are also written to the information indicator register 90. The processing section 60 can therefore use these storage addresses to learn the addresses of the data pointers.

For TS packets comprising an I picture, PES header, or GOP header in FIG. 30, for example, it is necessary to transfer them to the digital tuner 20 through the Bus 1 during special reproduction. The processing section 60 therefore writes the ISO headers IH0 to IH5 comprising the data pointers DP0 to DP5 of those TS packets to the header area.

For TS packets comprising B picture, P picture, or audio data. On the other hand, it is not necessary for them to be transferred to the digital tuner 20 during special reproduction. The processing section 60 therefore does not write the isochronous headers comprising those data pointers to the header area. In other words, the processing section 60 sets the data pointers so that the data transfer of those packets is skipped.

The DMAC1 uses the thus-set data pointers to select TS packets and transfer them to the digital tuner 20 through the BUS1. More specifically, it sequentially reads isochronous headers in the header area from the start. Using the data pointers comprised by the isochronous headers, it then selects the TS packets to be combine with those isochronous headers. As shown by way of example in FIG. 30, TS packets TS0, TS1, TS2, TSK+1, TSK+2, and TSK+3 are selected by data pointers DP0 to DP5. The isochronous headers and the thus-selected TS packets (second-layer packets of a lower layer) are linked together to assemble isochronous packets (first-layer packets of the higher layer), for transfer through the BUS1. Note that these isochronous packets comprise the CIP and SP headers shown in FIGS. 2B, 2C, and 2D.

This embodiment configured as described above is successful in selecting and efficiently transferring TS packets comprising I pictures during special reproduction such as fast-forwarding.

Note that the present invention is not limited to the embodiments described above, and thus various modifications thereto are possible within the scope of the present invention laid out herein.

For example, terminology (such as: SRAM, SDRAM, SRAM interface, SDRAM interface, IEEE 1394 or USB bus, IDE bus, 1394 interface, IDE interface, DMAC1, DMAC2, DMAC3, HDD, DTCP, and DES) that is derived from generic terminology defined within this document (such as: first memory, second memory, first memory interface, second memory interface, first bus, second bus, first bus interface, second bus interface, first memory access control circuit, second memory access control circuit, third memory access control circuit, storage medium, first encryption/decryption process, and second encryption/decryption process) could be substituted into other generic terminology used within this document.

It is possible for an aspect of the present invention that is defined by a dependent claim to omit some of the configurational requirements of the corresponding antecedent claim. Similarly, the components of the present invention defined by an independent claim can also be allocated to other independent claims.

The configuration of the data transfer control device of the present invention is not limited to those shown in FIGS. 3, 9A to 12, 18, and 27, and thus various modifications thereto are possible. For example, some of the various blocks and units in these figures can be omitted, and the connective relationships therebetween can be modified.

The present invention can also be applied to data transfer in accordance with bus standards that are based on a similar concept to that of IEEE 1394 or USB, or standards that are developed from IEEE 1394 or USB. Alternatively, the present invention can be applied to transfer over a bus (high-speed serial bus) conforming to a standard other than IEEE 1394 or USB.

What is claimed is:

1. A data transfer control device for data transfer through a bus, comprising:
    a transfer number reservation register which is used by a processing section to reserve a number of transfers for an isochronous packet which includes isochronous data and is transferred to a first bus side in an isochronous transfer cycle; and
    a first memory access control circuit which reads an isochronous packet from a first memory and automatically transfers the thus-read isochronous packet to the first bus side in the isochronous transfer cycle, until the number of transfers which is reserved in the transfer number reservation register reaches zero, and wherein:
    a storage area of the first memory includes a header area and a data area;
    the header area includes Kth and Lth page areas;
    the transfer number reservation register includes transfer number reservation registers for the Kth and Lth pages, for reserving a number of transfers for the Kth and Lth page areas; and
    while the processing section is preparing an isochronous header to be written to the Kth page area, the first memory access control circuit reads an isochronous header written to the Lth page area and isochronous data written to the data area, and automatically transfers an isochronous packet configured of the thus-read isochronous header and isochronous data, to the first bus side in each isochronous transfer cycle, until a number of transfers which is reserved in the transfer number reservation register for the Lth page reaches zero.

2. The data transfer control device as defined in claim 1, wherein:
    when a number of transfers reserved in the transfer number reservation register has reached zero, the first memory access control circuit halts the automatic transfer at the next isochronous transfer cycle and outputs an interrupt to the processing section.

3. A data transfer control device for data transfer through a bus, comprising:
    a transfer number reservation register which is used by a processing section to reserve a number of transfers for an isochronous packet which includes isochronous data; and
    a first memory access control circuit which reads an isochronous packet from a first memory and automatically transfers the thus-read isochronous packet to a first bus side in each isochronous transfer cycle, until a number of transfers which is reserved in the transfer number reservation register reaches zero, and wherein:
    a storage area of the first memory includes a header area and a data area;
    a data pointer which indicates an address in the data area for isochronous data to be combined with an isochronous header is written to the header area;
    the first memory access control circuit assembles an isochronous packet configured of the isochronous header and isochronous data by using the data pointer, for automatic transfer to the first bus side; and
    when isochronous data which is written to the data area includes a plurality of second-layer packets located lower than isochronous packets, the first memory access control circuit uses the data pointer to sort a second-layer packet which is to be transferred to the first bus side from a second-layer packet which is not to be transferred to the first bus side.

4. The data transfer control device as defined in claim 3, wherein:
during special reproduction of a storage medium, the first memory access control circuit uses the data pointer to select a second-layer packet including an I picture and automatically transfer the thus-selected second-layer packet to the first bus side.

5. A data transfer control device for data transfer through a bus, comprising:
a transfer number reservation register which is used by a processing section to reserve a number of transfers for an isochronous packet which includes isochronous data;
a first memory access control circuit which reads an isochronous packet from a first memory and automatically transfers the thus-read isochronous packet to a first bus side in each isochronous transfer cycle, until a number of transfers which is reserved in the transfer number reservation register reaches zero;
a third memory access control circuit which writes isochronous data transferred from a second bus side connected to a storage medium, into a second memory having a larger capacity than the first memory, the second memory is a synchronized type of memory which is capable of inputting and outputting data having sequential addresses in synchronization with a clock; and
a second memory access control circuit which reads isochronous data written to the second memory and writes the thus-read isochronous data into the first memory.

6. A data transfer control device for data transfer through a bus, comprising:
a transfer number reservation register which is used by a processing section to reserve a number of transfers for an isochronous packet which includes isochronous data;
a first memory access control circuit which reads an isochronous packet from a first memory and automatically transfers the thus-read isochronous packet to a first bus side in each isochronous transfer cycle, until a number of transfers which is reserved in the transfer number reservation register reaches zero, the first memory is internal memory provided within the data transfer control device;
a third memory access control circuit which writes isochronous data transferred from a second bus side connected to a storage medium, into a second memory having a larger capacity than the first memory, the second memory is external memory provided outside the data transfer control device; and
a second memory access control circuit which reads isochronous data written to the second memory and writes the thus-read isochronous data into the first memory.

7. The data transfer control device as defined in claim 5, wherein:
the first memory is internal memory provided within the data transfer control device, and the second memory is external memory provided outside the data transfer control device.

8. An electronic instrument comprising:
the data transfer control device as defined in claim 1; and
a storage medium connected to the second bus of the data transfer control device, for storing data transferred through the second bus.

9. An electronic instrument comprising:
the data transfer control device as defined in claim 2; and
a storage medium connected to the second bus of the data transfer control device, for storing data transferred through the second bus.

10. An electronic instrument comprising:
the data transfer control device as defined in claim 3; and
a storage medium connected to the second bus of the data transfer control device, for storing data transferred through the second bus.

11. An electronic instrument comprising:
the data transfer control device as defined in claim 5; and
a storage medium connected to the second bus of the data transfer control device, for storing data transferred through the second bus.

12. A data transfer control method for data transfer through a bus, the method comprising:
reserving a number of transfers for an isochronous packet which includes isochronous data and is transferred to a first bus side in an isochronous transfer cycle, in a transfer number reservation register; and
reading an isochronous packet from a first memory, and automatically transferring the thus-read isochronous packet to the first bus side in the isochronous transfer cycle, until the number of transfers reserved in the transfer number reservation register reaches zero, and wherein:
a storage area of the first memory includes a header area and a data area;
the header area includes Kth and Lth page areas;
the transfer number reservation register includes transfer number reservation registers for the Kth and Lth pages, for reserving a number of transfers for the Kth and Lth page areas; and
while the processing section is preparing an isochronous header to be written to the Kth page area, an isochronous header which is written to the Lth page area and isochronous data which is written to a data area are read, and an isochronous packet configured of the thus-read isochronous header and isochronous data is automatically transferred to the first bus side in each isochronous transfer cycle, until a number of transfers which is reserved in the transfer number reservation register for the Lth page reaches zero.

13. The data transfer control method as defined in claim 12, wherein:
when a number of transfers reserved in the transfer number reservation register has reached zero, the automatic transfer is halted at the next isochronous transfer cycle and an interrupt is outputted to the processing section.

14. A data transfer control method for data transfer through a bus, the method comprising:
reserving a number of transfers for an isochronous packet which includes isochronous data, in a transfer number reservation register; and
reading an isochronous packet from a first memory, and automatically transferring the thus-read isochronous packet to a first bus side in each isochronous transfer cycle, until a number of transfers reserved in the transfer number reservation register reaches zero, and wherein:

a storage area of the first memory includes a header area and a data area;

a data pointer which indicates an address in the data area for isochronous data to be combined with an isochronous header is written to the header area;

an isochronous packet configured of the isochronous header and isochronous data is assembled by using the data pointer, for automatic transfer to the first bus side; and when isochronous data which is written to the data area includes a plurality of second-layer packets located lower than isochronous packets, a second-layer packet which is to be transferred to the first bus side is sorted from a second-layer packet which is not to be transferred to the first bus side by using the data pointer.

15. A data transfer control method for data transfer through a bus, the method comprising:

reserving a number of transfers for an isochronous packet which includes isochronous data, in a transfer number reservation register;

reading an isochronous packet from a first memory, and automatically transferring the thus-read isochronous packet to a first bus side in each isochronous transfer cycle, until a number of transfers reserved in the transfer number reservation register reaches zero;

writing isochronous data transferred from a second bus side connected to a storage medium, into a second memory having a larger capacity than the first memory, the second memory is a synchronized type of memory which is capable of inputting and outputting data having sequential addresses in synchronization with a clock; and reading isochronous data written to the second memory and writing the thus-read isochronous data into the first memory.

16. A data transfer control method for data transfer through a bus, the method comprising:

reserving a number of transfers for an isochronous packet which includes isochronous data, in a transfer number reservation register;

reading an isochronous packet from a first memory, and automatically transferring the thus-read isochronous packet to a first bus side in each isochronous transfer cycle, until a number of transfers reserved in the transfer number reservation register reaches zero, the first memory is internal memory provided within the data transfer control device;

writing isochronous data transferred from a second bus side connected to a storage medium, into a second memory having a larger capacity than the first memory, the second memory is external memory provided outside the data transfer control device; and reading isochronous data written to the second memory and writing the thus-read isochronous data into the first memory.

17. An electronic instrument comprising:

the data transfer control device as defined in claim 6; and a storage medium connected to the second bus of the data transfer control device, for storing data transferred through the second bus.

* * * * *